US009569152B2

(12) United States Patent
Asai

(10) Patent No.: US 9,569,152 B2
(45) Date of Patent: Feb. 14, 2017

(54) COMMUNICATION APPARATUS

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/469,977

(22) Filed: Aug. 27, 2014

(65) Prior Publication Data

US 2015/0062633 A1 Mar. 5, 2015

(30) Foreign Application Priority Data

Aug. 28, 2013 (JP) ................................ 2013-177007

(51) Int. Cl.

*G06F 3/12* (2006.01)
*H04N 1/00* (2006.01)
*H04B 5/00* (2006.01)

(52) U.S. Cl.

CPC ........... *G06F 3/1236* (2013.01); *G06F 3/1204* (2013.01); *G06F 3/1205* (2013.01); *G06F 3/1212* (2013.01); *G06F 3/1257* (2013.01); *G06F 3/1292* (2013.01); *H04N 1/00315* (2013.01); *H04B 5/0031* (2013.01)

(58) Field of Classification Search

CPC ..................................................... G06F 3/1236
See application file for complete search history.

(56) References Cited

U.S. PATENT DOCUMENTS

| | | | | |
|---|---|---|---|---|
| 9,071,282 | B1 * | 6/2015 | Want ........................ | H04B 5/02 |
| 2011/0043857 | A1 | 2/2011 | Hiroki | |
| 2014/0085663 | A1 * | 3/2014 | Kavanappillil et al. ..... | 358/1.15 |

FOREIGN PATENT DOCUMENTS

| | | | |
|---|---|---|---|
| JP | 2007-166538 | A | 6/2007 |
| JP | 2009-251823 | A | 10/2009 |

* cited by examiner

*Primary Examiner* — Mohammad Ghayour
*Assistant Examiner* — Lennin Rodriguezgonzalez
(74) *Attorney, Agent, or Firm* — Banner & Witcoff, Ltd.

(57) ABSTRACT

Aspects of the disclosure provide a communication apparatus that can use preferable settings regardless of which of communication in a near-field wireless communication method and communication in a wireless communication method different from the near-field wireless communication method is used as a trigger to start a function. The communication apparatus may include a controller. The controller may, if communication carried out in a near-field wireless communication method, transmit at least one of first setting table and data created based on the first setting table to an external device, and, if communication is carried out in the wireless communication method, transmit at least one of second setting table and data created based on the second setting table to the external device.

17 Claims, 23 Drawing Sheets

Fig. 1B 12c, 12d, 12e

| PURPOSE (40) | ITEM (41) | SETTING (42) |
|---|---|---|
| PHOTO | SHEET SIZE | *** |
| | SHEET TYPE | *** |
| DOCUMENT | SHEET SIZE | *** |
| | SHEET TYPE | *** |
| WEB | SHEET SIZE | *** |
| | SHEET TYPE | *** |

COMMUNICATION APPARATUS

CROSS-REFERENCE TO RELATED APPLICATION

This application claims priority from Japanese Patent Application No. 2013-177007, filed on Aug. 28, 2013, which is incorporated herein by reference in its entirety.

TECHNICAL FIELD

Aspects disclosed herein relate to a communication apparatus which has wireless communication unit.

BACKGROUND

A technology known in the prior art is applicable to a communication apparatus that can perform both communication in a near-field wireless communication method and communication based on a wireless local area network (LAN) standard. Specifically, in the known technology, if the communication method used in a distant apparatus, the method being obtained through communication in a near-field wireless communication method, indicates a wireless LAN standard applicable to the local apparatus, communication with the distant apparatus is switched to communication based on the wireless LAN standard, after which data transmission is carried out.

SUMMARY

Aspects of the disclosure provide and a communication apparatus that can use preferable settings regardless of which of communication in a near-field wireless communication method and communication in a wireless communication method different from the near-field wireless communication method is used as a trigger to start a function. The communication apparatus may include a controller. The controller may, if communication carried out in a near-field wireless communication method, transmit at least one of first setting table and data created based on the first setting table to an external device, and, if communication is carried out in the wireless communication method, transmit at least one of second setting table and data created based on the second setting table to the external device.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 1B illustrates an example of a near-field communication (NFC) setting table and a wireless fidelity (Wi-Fi) setting table in the first embodiment.

DETAILED DESCRIPTION

Figure 1A:
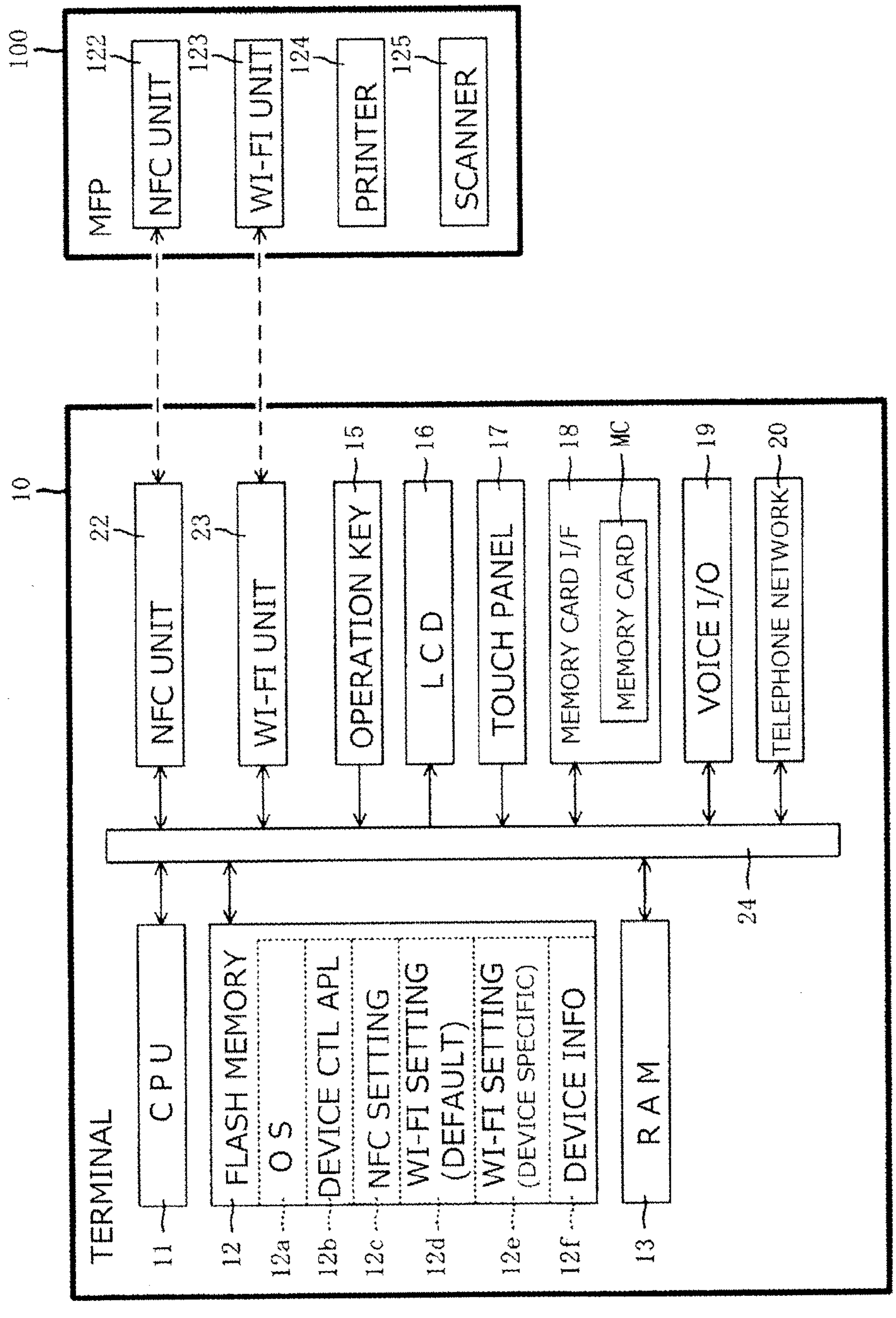
FIG. 1A is a block diagram illustrating the electric structure of a terminal in a first embodiment.

Preferred embodiment of the present invention will be described with reference to the attached drawings. A first embodiment will be described first with reference to FIGS. 1A to 3E. FIG. 1A is a block diagram illustrating the electric structure of a terminal 10. In the terminal 10, a device control application 12*b*, which is an embodiment of a communication program in the present invention, is installed. Although described later in detail, when using the print function of a multi-function peripheral (MFP) 100 through near-field wireless communication method, the terminal 10, in which the device control application 12*b* is installed, is superior in convenience.

The terminal 10 in the first embodiment is structured as a smart phone or another terminal. The terminal 10 includes a central processing unit (CPU) 11, a flash memory 12, a random-access memory (RAM) 13, manipulation keys 15, a liquid crystal display (LCD) 16, a touch panel 17, a memory card interface 18, a voice input/output unit 19, a telephone network communication unit 20, a near-field communication unit 22, and a wireless communication unit 23. These components are mutually connected through a bus line 24.

The CPU 11 controls the components connected to the bus line 24 according to, for example, fixed values and a program that are stored in the flash memory 12 or another type of memory. The flash memory 12 is a rewritable non-volatile memory. The RAM 13 is a rewritable volatile memory, which includes a temporary area in which various types of data is temporarily stored when the CPU 11 executes, for example, the device control application 12*b*.

In the flash memory 12, an operating system (OS) 12*a* and device control application 12*b* are stored. In the descriptions below, the CPU 11 that executes an application, the operating system, and other programs may be indicated simply by a program name. For example, the term "application" may indicate the CPU 11 that executes the application. The OS 12*a* is basic software that implements the standard functions of the terminal 10. In the first embodiment, an Android (registered trademark) OS is used as the OS 12*a*.

The application 12*b* is an application provided by the vendor of a device (in the first embodiment, the MFP 100). The application 12*b* is installed in the terminal 10 by the user, after which the user can use the device from the terminal 10. The application 12*b* enables the use of the print function and scan function of the device directly from the terminal 10 without passing through, for example, a personal computer (PC).

In particular, the device control application 12*b* in the first embodiment uses a specific printing setting depending on whether communication that works as a trigger to use the print function of the MFP 100 is near-field wireless communication carried out by the near-field communication unit 22 or wireless communication carried out by the wireless communication unit 23. Therefore, preferable settings can be used regardless of whether communication that works a trigger to use the print function of the MFP 100 is communication carried out by the near-field communication unit 22 or communication carried out by the wireless communication unit 23. In the first embodiment, near-field wireless communication carried out by the near-field communication unit 22 is non-contact communication complying with the NFC standard, and wireless communication carried out by the wireless communication unit 23 is wireless communication complying with a Wi-Fi (registered trademark) standard. In the descriptions below, non-contact communication complying with the NFC standard may referred to as NFC communication and wireless communication complying with the Wi-Fi (registered trademark) standard may be referred to as Wi-Fi communication. Processing in all steps indicated in the flowchart in FIGS. 3A-3E, which will be described later, is executed by the CPU 11 under control by the device control application 12*b*.

The flash memory 12 stores an NFC setting table 12*c*, Wi-Fi setting tables 12*d* and 12*e*, device information 12*f*, and other information. Specifically, the NFC setting table 12*c*, Wi-Fi settings 12*d* and 12*e*, and device information 12*f* are stored in a storage area, in the flash memory 12, which is allocated for the device control application 12*b* and are used by the device control application 12*b*.

The NFC setting table 12*c* is a current printing setting table used to use the print function of the MFP 100 by using near-field wireless communication carried out by the near-field communication unit 22 as a trigger. In the first embodiment, one NFC setting table 12*c* is set regardless of the type (in the first embodiment, the model name) of the MFP 100 to which the device control application 12*b* is adaptable. In the descriptions below, printing in which near-field wireless communication carried out by the near-field communication unit 22 works as a trigger, that is, printing in which the NFC setting table 12*c* is used as a printing setting table, may be referred to as NFC printing. In the first embodiment, a trigger to start NFC printing is NFC communication established between the terminal 10 and the MFP 100 by bringing the terminal 10 close to the MFP 100.

The Wi-Fi setting tables 12*d* and 12*e* are each a current printing setting table used to use the print function of the MFP 100 by using wireless communication carried out by the wireless communication unit 23 as a trigger. In the descriptions below, printing in which wireless communication carried out by the wireless communication unit 23 works as a trigger, that is, printing in which the Wi-Fi setting table 12*d* or 12*e* is used as a printing setting table, may be referred to as Wi-Fi printing. In the first embodiment, a trigger to start Wi-Fi printing is a print command transmitted from the terminal 10 to the MFP 100 in Wi-Fi communication by tapping a Print button 52 (see FIG. 2).

Specifically, one Wi-Fi setting table 12*d* is set regardless of the type of the MFP 100 to which the device control application 12*b* is adaptable. However, the Wi-Fi setting table 12*e* is specific to a device type. One Wi-Fi setting table 12*e* is set for each model name of the MFP 100, the model name being stored as the device information 12*f*. In the descriptions below, the Wi-Fi setting table 12*d* may be referred to as the default Wi-Fi setting table 12*d* and the Wi-Fi setting table 12*e* may be referred to as the device-specific Wi-Fi setting table 12*e*.

When a model name indicating a type of the MFP 100 on the distant site in communication (simply referred to below as the distant site) is selected and the Print button 52 (see FIG. 2) is tapped, a device-specific Wi-Fi setting table 12*e* corresponding to the selected type is used. If the Print button 52 is tapped without the type of the MFP 100 on the distant site being selected, the default Wi-Fi setting table 12*d* is selected.

FIG. 1B illustrates an example of the NFC setting table 12*c* and Wi-Fi setting tables 12*d* and 12*e*. The NFC setting table 12*c*, default Wi-Fi setting table 12*d*, and device-specific Wi-Fi setting table 12*e* each include a plurality of items 41, which are a sheet size, a sheet type and the like, and also include settings 42 corresponding to these items 41. Although, in the example in FIG. 1B, only two items 41, which are a sheet size and a sheet type, are illustrated for convenience, this is not a limitation; the number of items 41 may be 1 or at least 3. The items 41 are not limited to a sheet size and a sheet type; they may be an item to select monochrome printing or color printing, an item to select one-sided printing or double-sided printing, and item to select a layout in printing in which a plurality of pages are printed on a single sheet.

The setting tables 12*c* to 12*e* each have a combination of the item 41 and setting 42 for each purpose 40. The purpose 40 indicates a purpose of printing. Examples of the purpose 40 include the printing of a photo, the printing of a Portable Document Format (PDF) file, an Office file, or another type of document, and the printing of a Web page. In the first embodiment, a purpose is selected on a menu screen (not illustrated) displayed on the LCD 16 when the device control application 12*b* is activated. A combination of the items 41 and their settings 42 corresponding to the purpose 40 selected on the menu screen from the NFC setting table 12*c* or Wi-Fi setting table 12*d* or 12*e* is referenced.

The setting range of the setting 42 of each item 41 in the setting tables 12*c* to 12*e* varies among the setting tables 12*c* to 12*e*. Specifically, in the device-specific Wi-Fi setting table 12*e*, the setting range of the setting 42 of each item 41 is determined according to the capacity (so-called specifications) of the MFP 100, which is a device. Therefore, the setting 42 in the device-specific Wi-Fi setting table 12*e* can be set within a range determined according to the capacity identified by the type, that is, the model name, of the MFP 100.

In the NFC setting table 12*c* and default Wi-Fi 12*d*, one setting range has been set by default for each item 41. For some items 41, a default setting range common to the NFC setting table 12*c* and Wi-Fi setting table 12*d* has been set. For other items 41, different default setting ranges have been set between the NFC setting table 12*c* and the Wi-Fi setting table 12*d*. In the descriptions below, the latter items may be referred to as specific items.

In the first embodiment, the setting range of a specific item in the NFC setting table 12*c* is set with respect to a device having a high capacity. In the first embodiment, the setting range of a sheet size, which is a specific item in the NFC setting table 12*c*, is a range that includes, for example, A3 as the maximum size. Since the setting 42 of a specific item in the NFC setting table 12*c* can be set within a range determined with respect to a device having a high capacity, even if NFC printing is performed by using an MFP 100 having a high capacity as the distant device, printing that makes full use of the capacity can be performed without the capacity being sacrificed.

In contrast, the setting range of a specific item in the default Wi-Fi setting table 12*d* is a range that ordinary devices can use. Therefore, the setting range of the specific item in the Wi-Fi setting table 12*d* is smaller than the setting range of the corresponding specific item in the NFC setting table 12*c*, which is set with respect to a device having a high capacity. In the first embodiment, the setting range of a sheet size, which is a specific item in the default Wi-Fi setting table 12_d_, is a range that includes A4, which ordinary devices can use, as the maximum size. Since the setting 42 in the default Wi-Fi setting table 12_d_ can be set within a range that ordinary devices can use, it is possible to prevent a situation in which printing cannot be performed because of an insufficient device capacity.

The setting range of the setting 42 of each item 41 in the setting tables 12_c_ to 12_e_ also differs depending on the purpose 40. In all of the NFC setting table 12_c_, default Wi-Fi setting table 12_d_, and device-specific Wi-Fi setting table 12_e_, the setting ranges of some items 41 of the same type differ depending on the purpose 40. If, for example, the purpose 40 is to print a photo, the photo is less likely to be printed on a large-sized sheet such as A3 sheet, so even if up to A3 can be set for other purposes 40, the setting range of the sheet size is set to a relatively small range such as a range up to A4. When the upper limit of the settable sheet size is restricted to a small value, printing can be performed with priority given to image quality.

If the purpose 40 is to print a document, there is the possibility that the user wants to print the document on sheet as large as possible, so it is not preferable to restrict the setting range of the sheet size. When the purpose 40 is to print a document, therefore, the setting range of the sheet size in the setting tables 12_c_ to 12_e_ is used without being restricted. As described above, the setting range of the setting 42 of each item 41 in the setting tables 12_c_ to 12_e_ is set suitable for the purpose 40.

The setting 42 of each item 41 for each purpose 40 in the setting tables 12_c_ to 12_e_ can be changed to a value desired by the user, as necessary. Since, as described above, the setting range of the setting 42 of each item 41 in the setting tables 12_c_ to 12_e_ varies among the setting tables 12_c_ to 12_e_ and according to the purpose 40, the user can appropriately change the setting 42 of each item 41 within a setting range determined for each of the setting tables 12_c_ to 12_e_ and according to the purpose 40. Therefore, the user can set the setting 42 within a setting range that matches the type of printing, NFC printing or Wi-Fi printing, and the purpose 40, so the user can obtain a preferable print result for the type of printing and the purpose 40.

Referring again to FIG. 1A, the device information 12_f_ includes a model name indicating the type of the MFP 100 and specification information associated with the model name. The specification information indicates the capacity of the MFP 100. The device information 12_f_ is stored for each of the model names of MFPs 100 with which Wi-Fi printing can be used. The user can appropriately add the device information 12_f_. For example, the user can obtain a model name and capacity from an MFP 100 that communicates with the terminal 10 by Wi-Fi, can associate the obtained model name and capacity with each other as the device information 12_f_, and can store it in the flash memory 12.

The manipulation keys 15 are mechanical keys used to input a command and the like into the terminal 10. The manipulation keys 15 are provided on, for example, the case of the terminal 10. The LCD 16 displays various screens. The touch panel 17, which is overlaid on the LCD 16, inputs a command and the like into the terminal 10 when the user touches the touch panel 17 with a finger, a rod, or another indicating body or brings it close to the touch panel 17. The memory card interface 18 is an interface in which a rewritable non-volatile memory card MC is mounted. The memory card interface 18 controls the writing and reading of data to and from the memory card MC. The voice input/output unit 19 is a voice input/output device structured with a microphone, a speaker, and the like. The telephone network communication unit 20 is a circuit used to make a call through a mobile telephone network (not illustrated).

The near field communication unit 22 is an interface used to perform near field communication, in which communication is possible over a short distance of, for example, about 10 cm. In the first embodiment, near field communication performed by the near field communication unit 22 is non-contact communication complying with the NFC standard, that is, NFC communication. In the first embodiment, the terminal 10 can perform NFC communication to and from the MFP 100, which includes a near field communication unit 122.

The wireless communication unit 23 is an interface used for wireless communication through a wireless LAN. In the first embodiment, communication performed by the wireless communication unit 23 is wireless communication performed through a wireless LAN complying with the IEE802.11 b/g standard. The terminal 10 can perform wireless communication complying with the Wi-Fi standard, that is, Wi-Fi communication, with an external device such as the MFP 100. The wireless communication unit 23 is wirelessly connected to a wireless communication unit 123 included in the MFP 100 in any one of an ad-hoc mode and an infrastructure mode. In the ad-hoc mode, the terminal 10 (specifically, the wireless communication unit 23) and MFP 100 (specifically, the wireless communication unit 123) are wirelessly connected to each other without passing through an access point (not illustrated), which is a relay apparatus. In the infrastructure mode, the terminal 10 and MFP 100 are wirelessly connected to each other with an access point intervening therebetween.

The MFP 100 includes a print function, a scan function, a copy function, a facsimile function, and other various types of functions. To implement these functions, the MFP 100 includes a printer unit 124, a scanner unit 125, a facsimile communication unit (not illustrated), and other units. The near field communication unit 122 in the MFP 100 is similar to the near field communication unit 22. The wireless communication unit 123 in the MFP 100 is also similar to the wireless communication unit 23.

Figure 2:
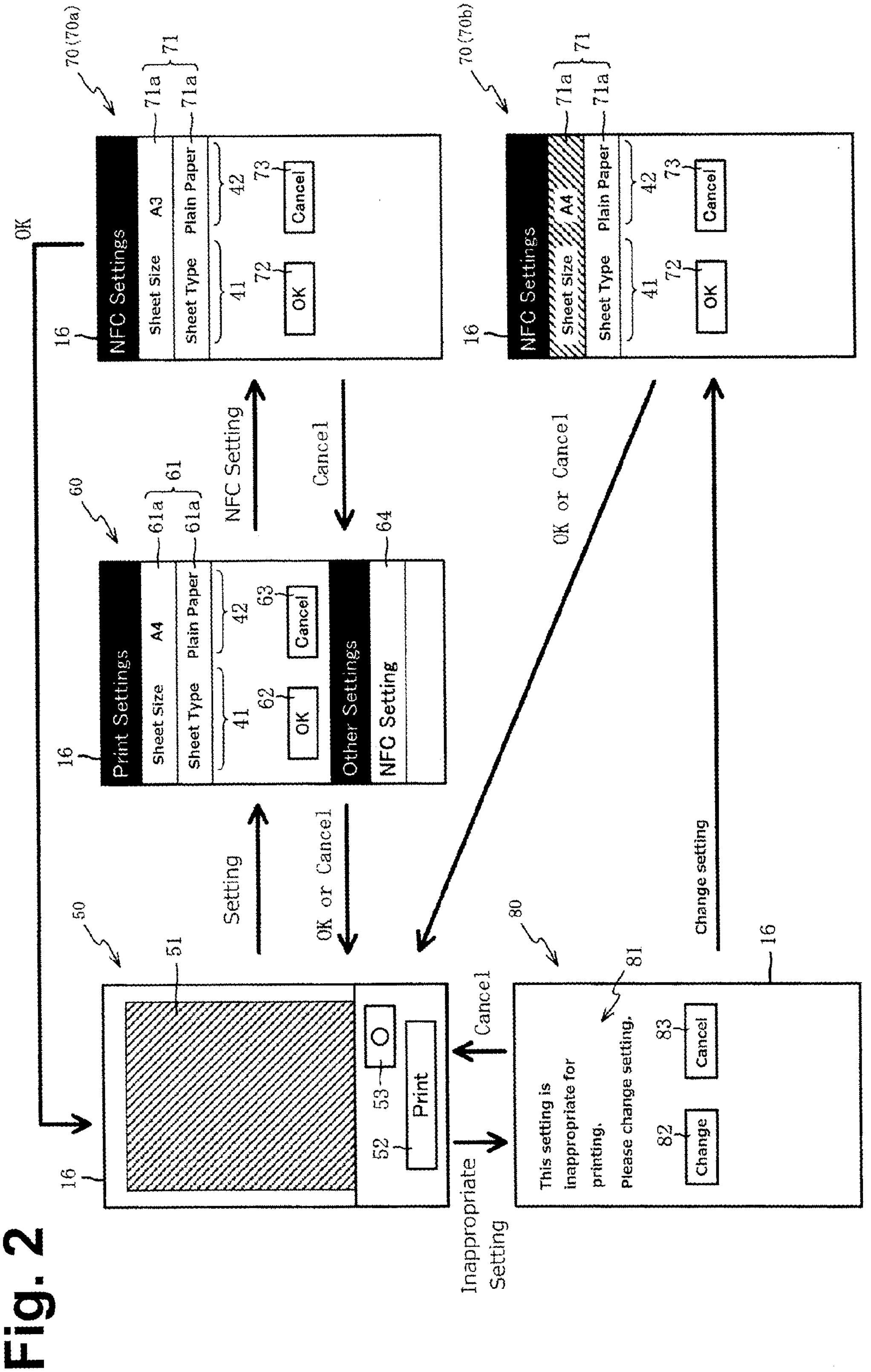
FIG. 2 schematically illustrates an example of how screens in the first embodiment are changed.
Figure 3A:
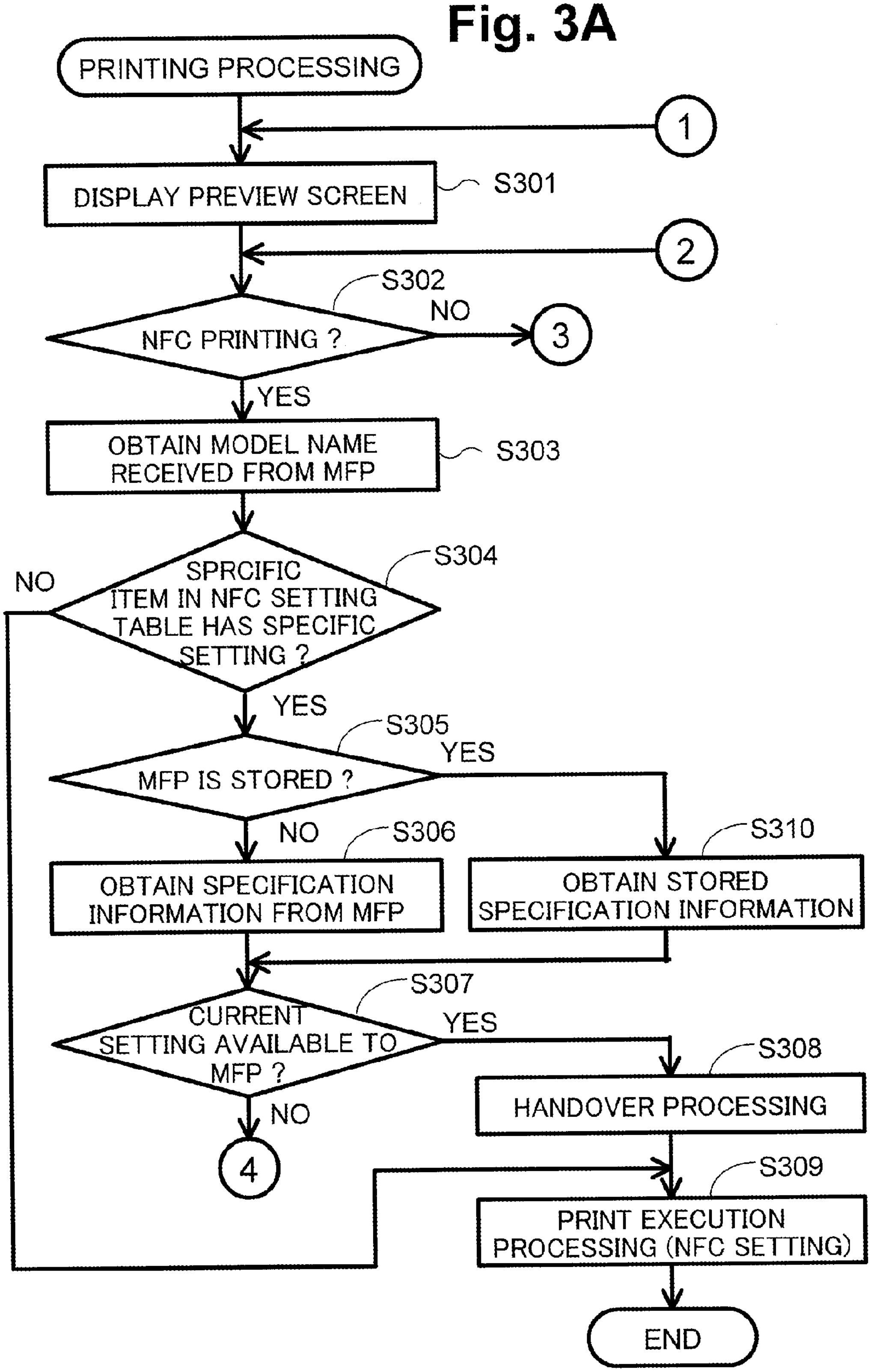
FIGS. 3A to 3E illustrate a flowchart of printing processing in the first embodiment.
Figure 3B:
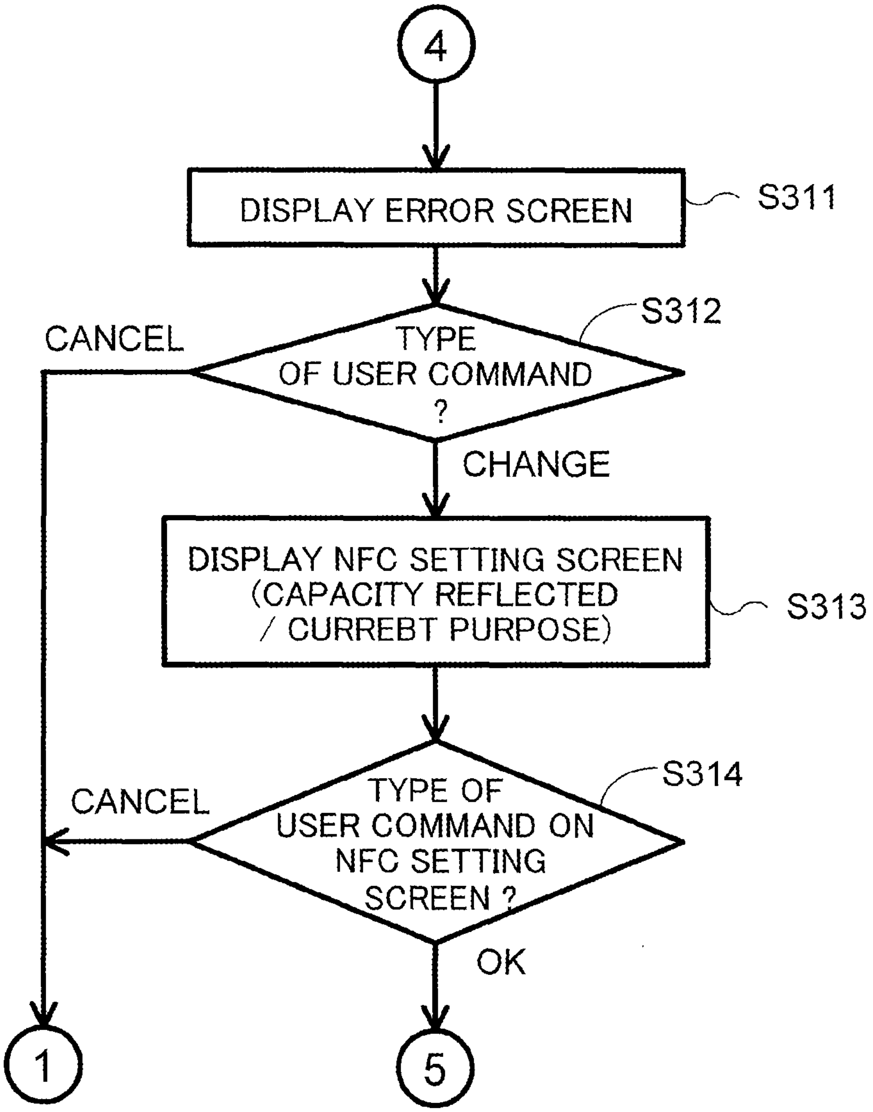
Figure 3C:
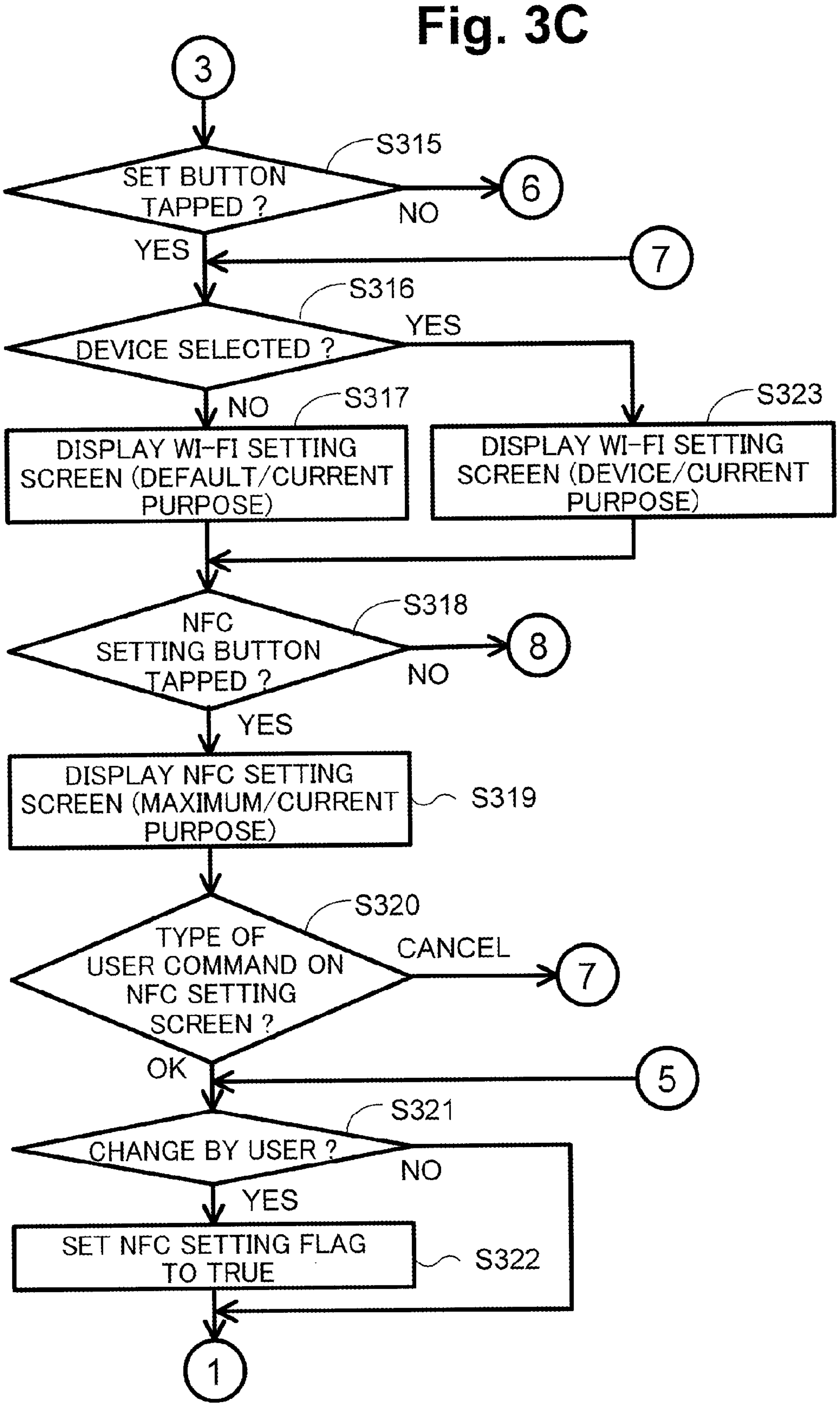
Figure 3D:
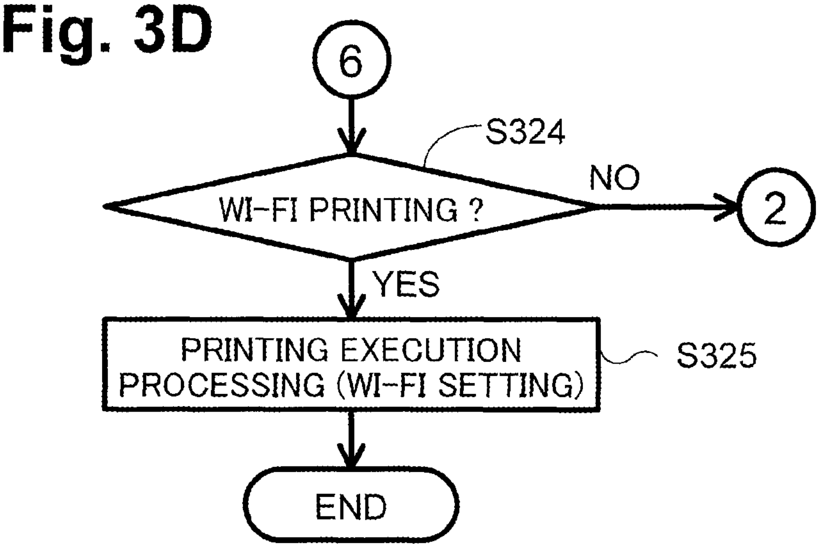
Figure 3E:
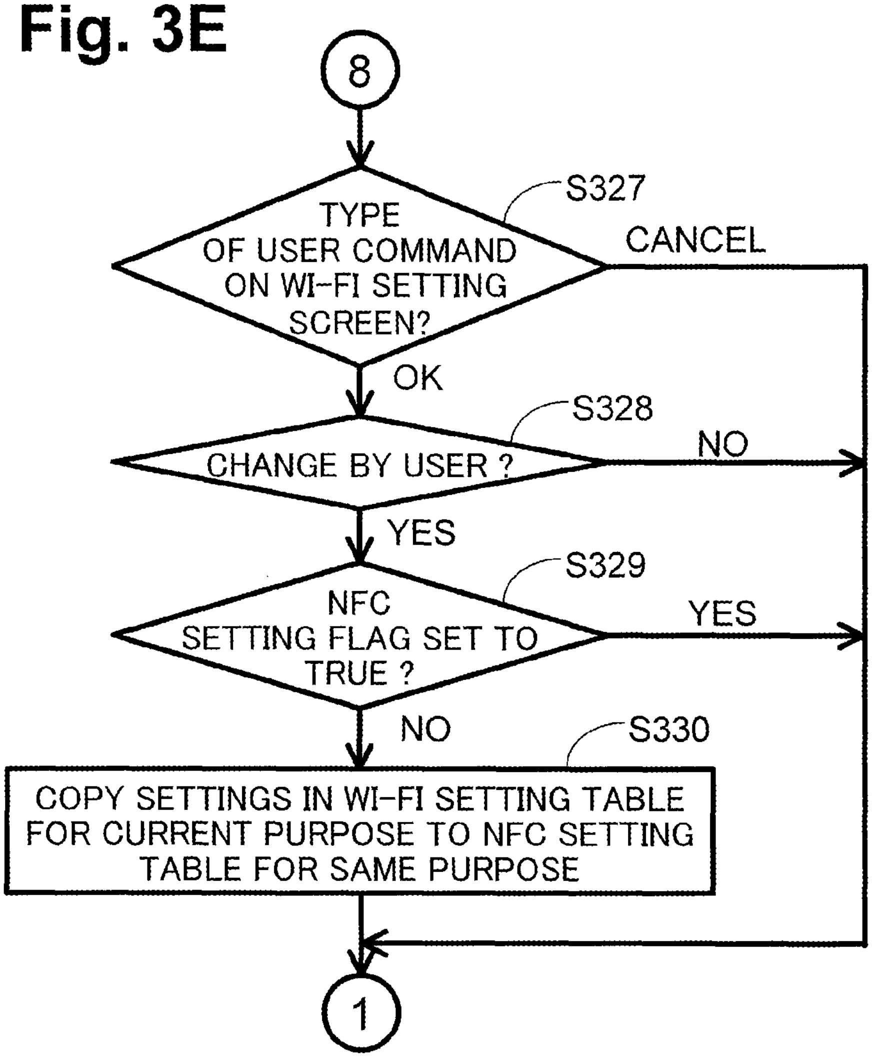
Figure 4A:
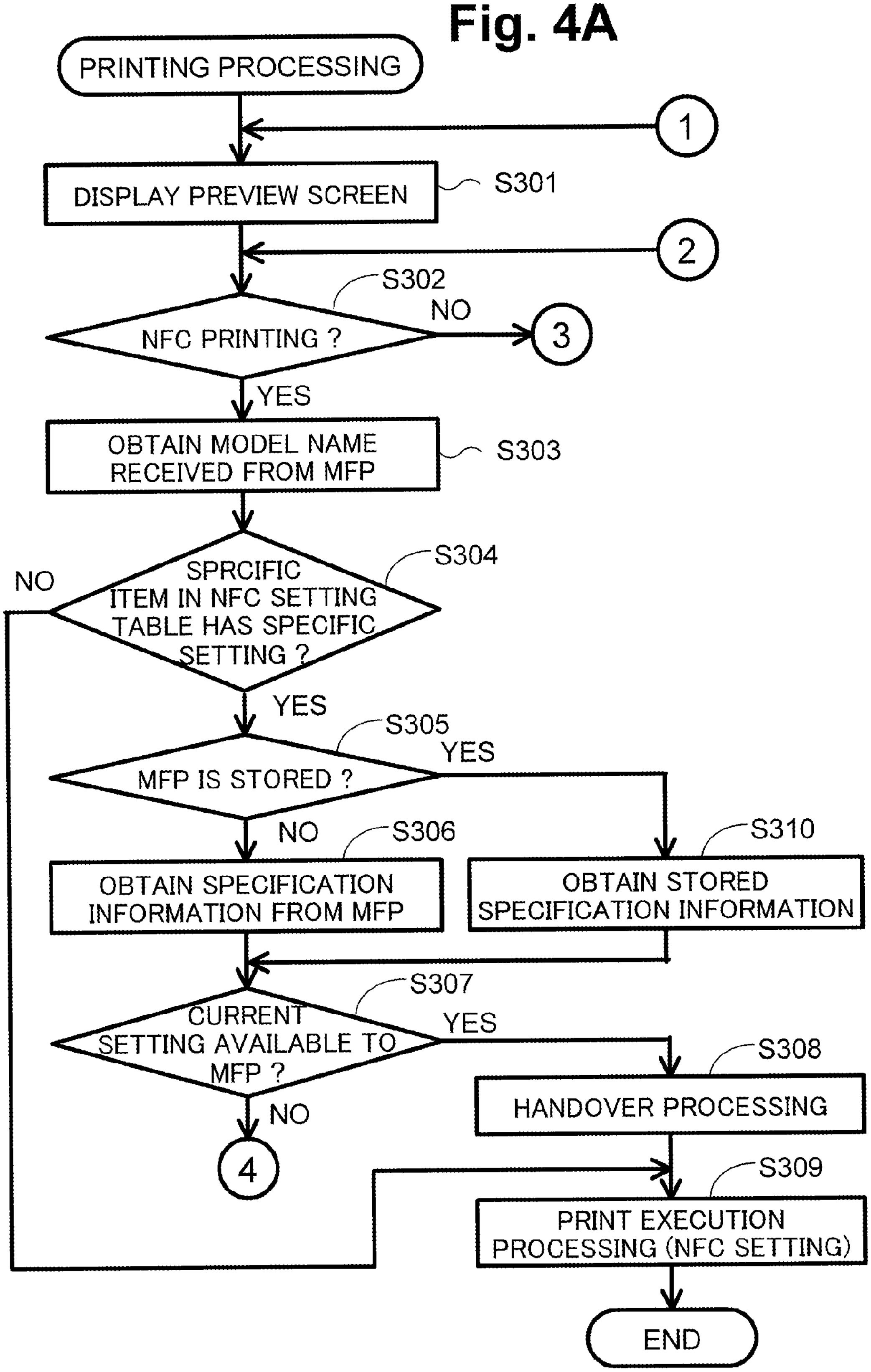
FIGS. 4A to 4E illustrate a flowchart of printing processing in a second embodiment.
Figure 4B:
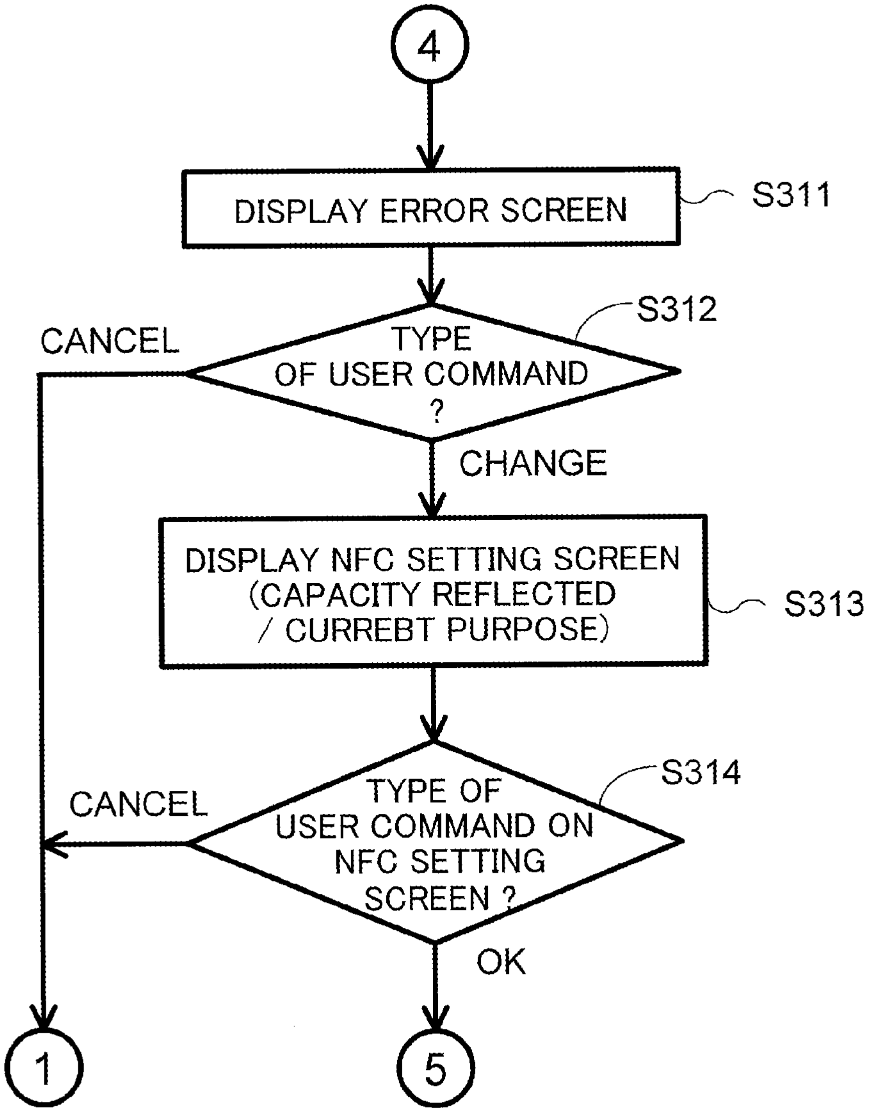
Figure 4C:
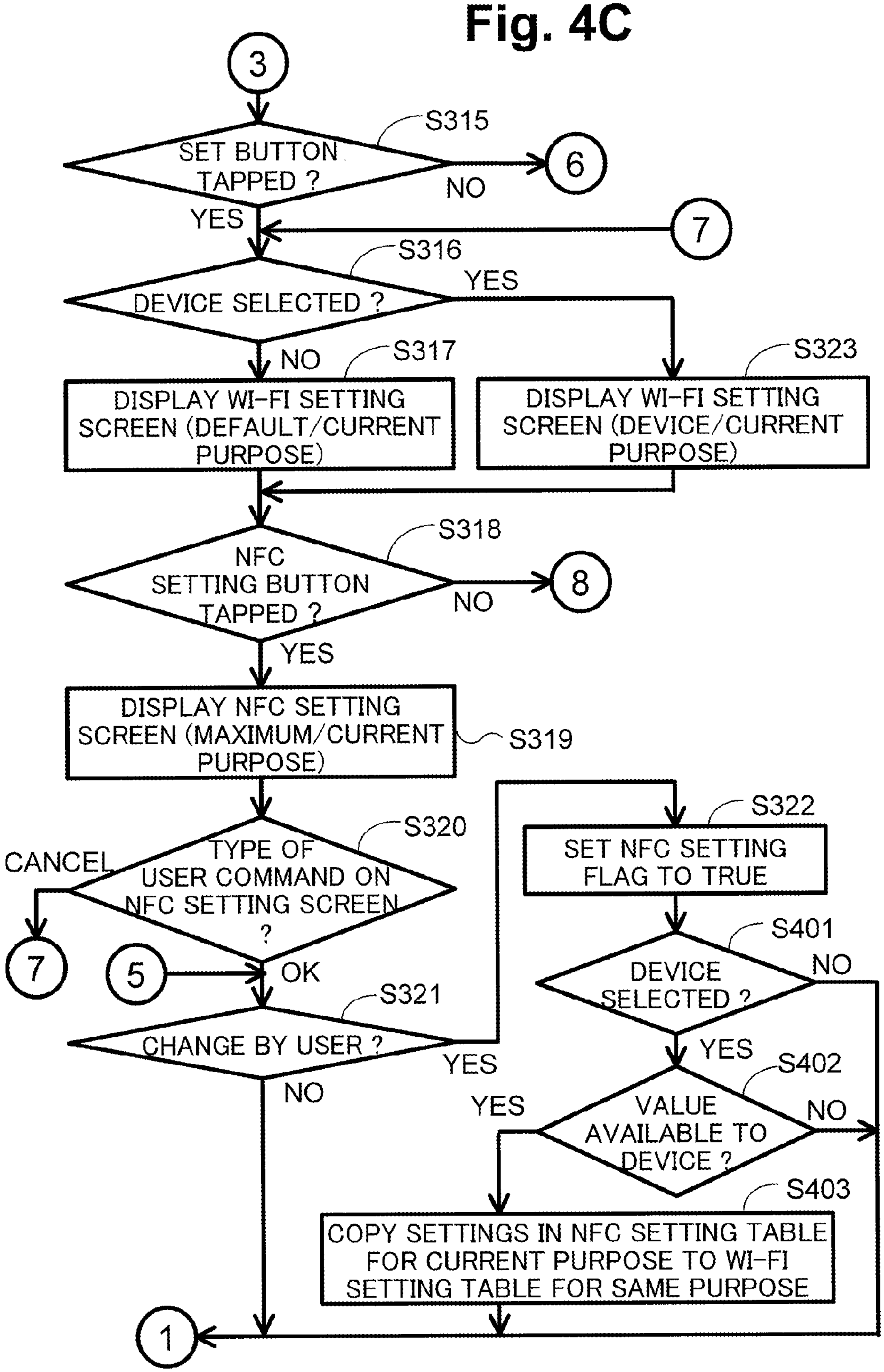
Figure 4D:
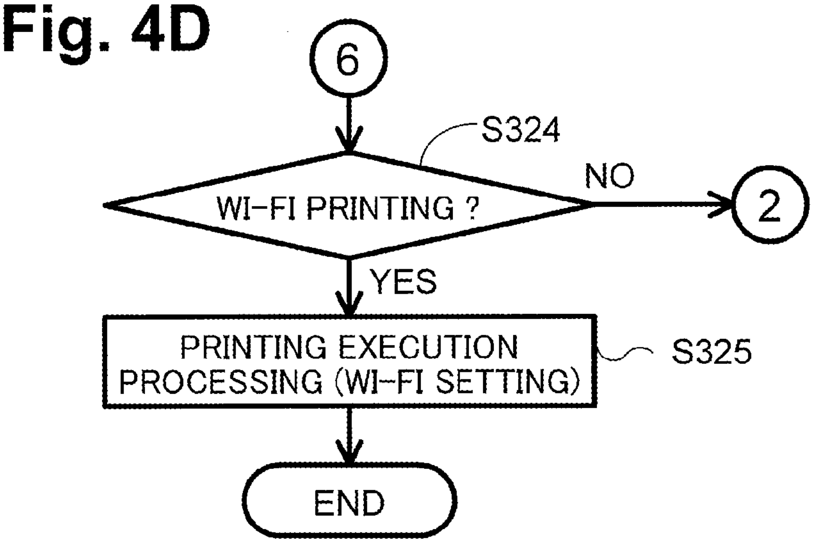
Figure 4E:
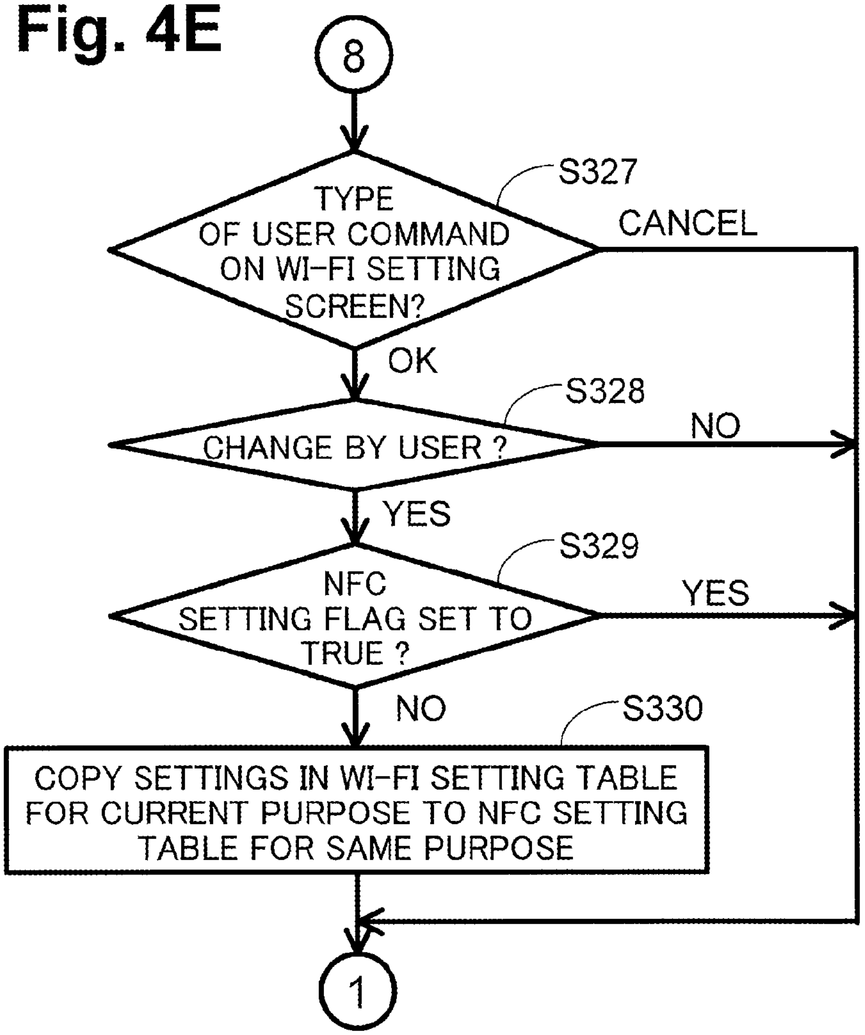
Figure 5A:
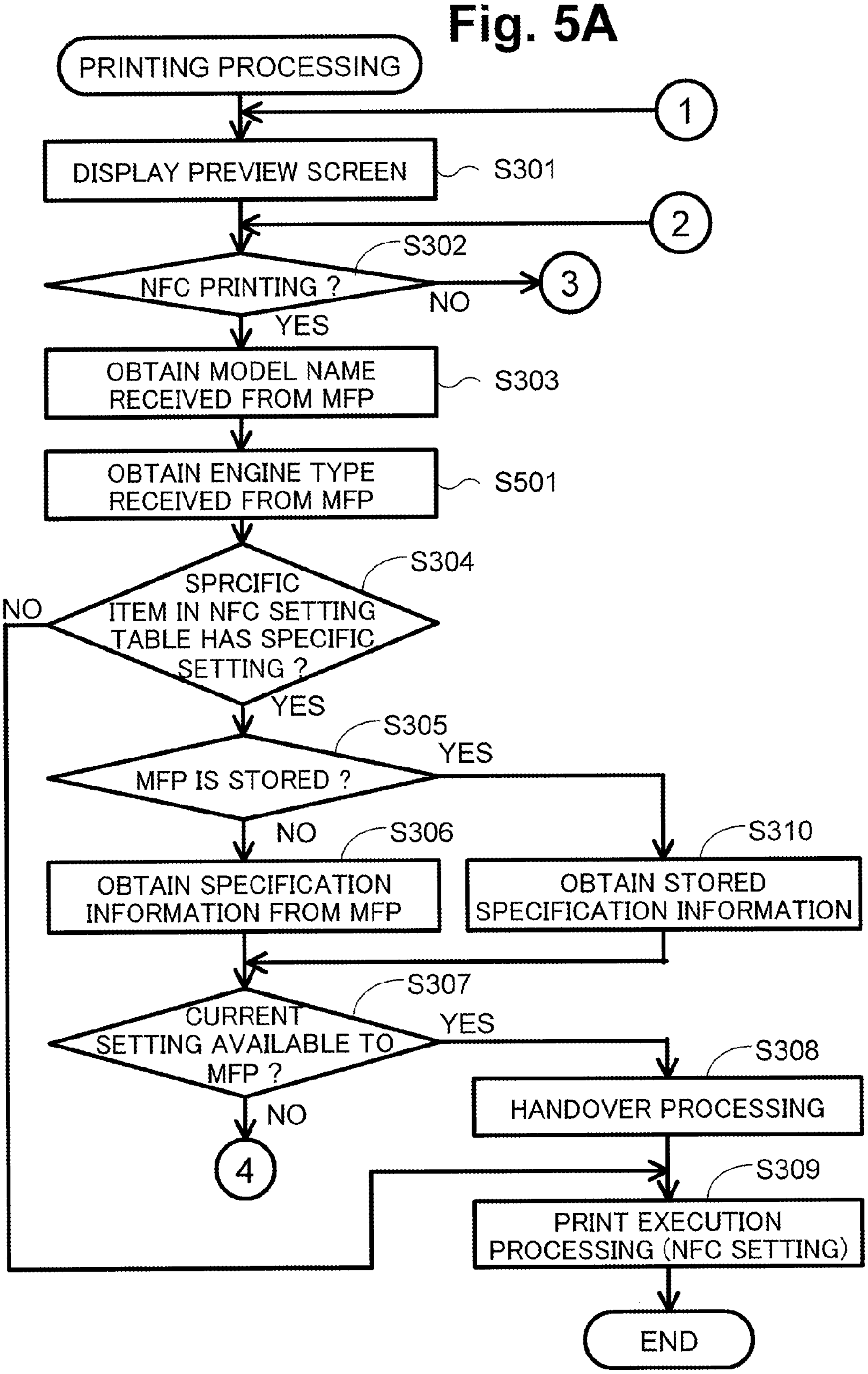
FIGS. 5A to 5E illustrate a flowchart of printing processing in a third embodiment.
Figure 5B:
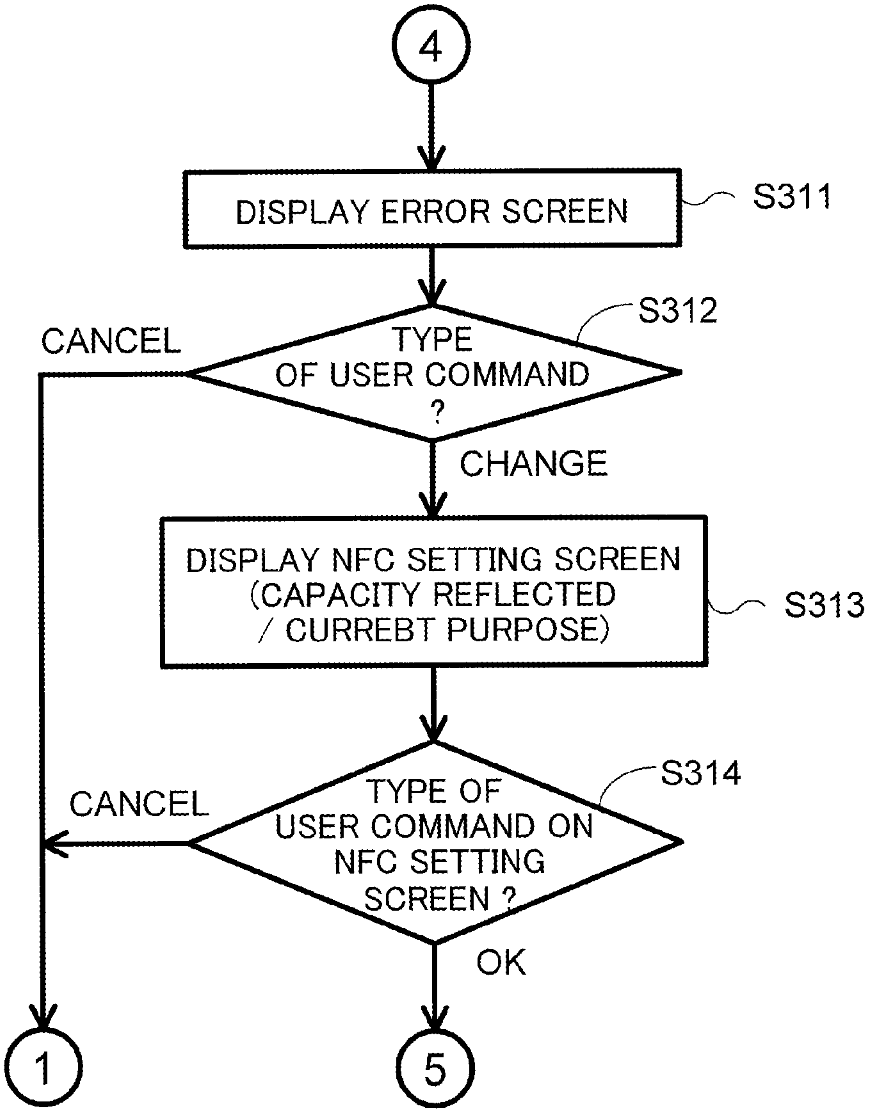
Figure 5C:
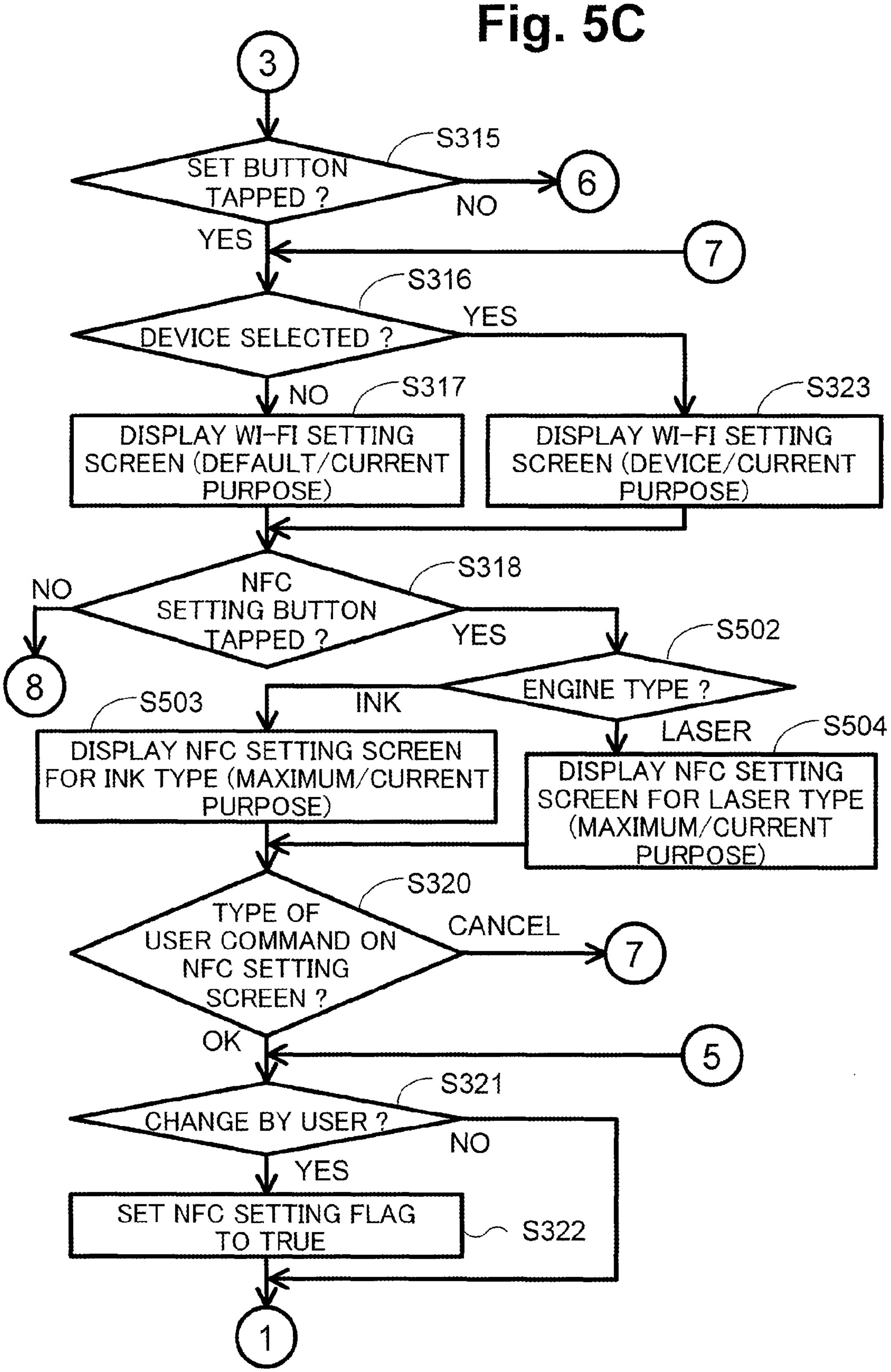
Figure 5D:
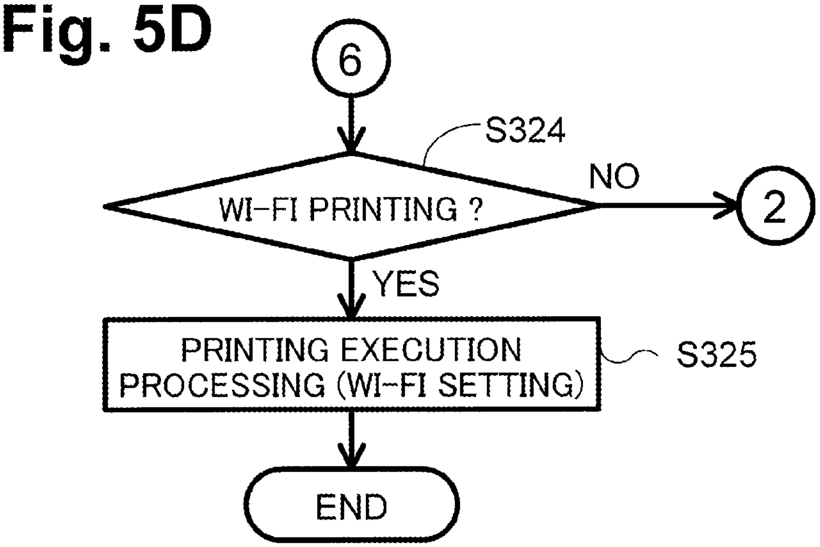
Figure 5E:
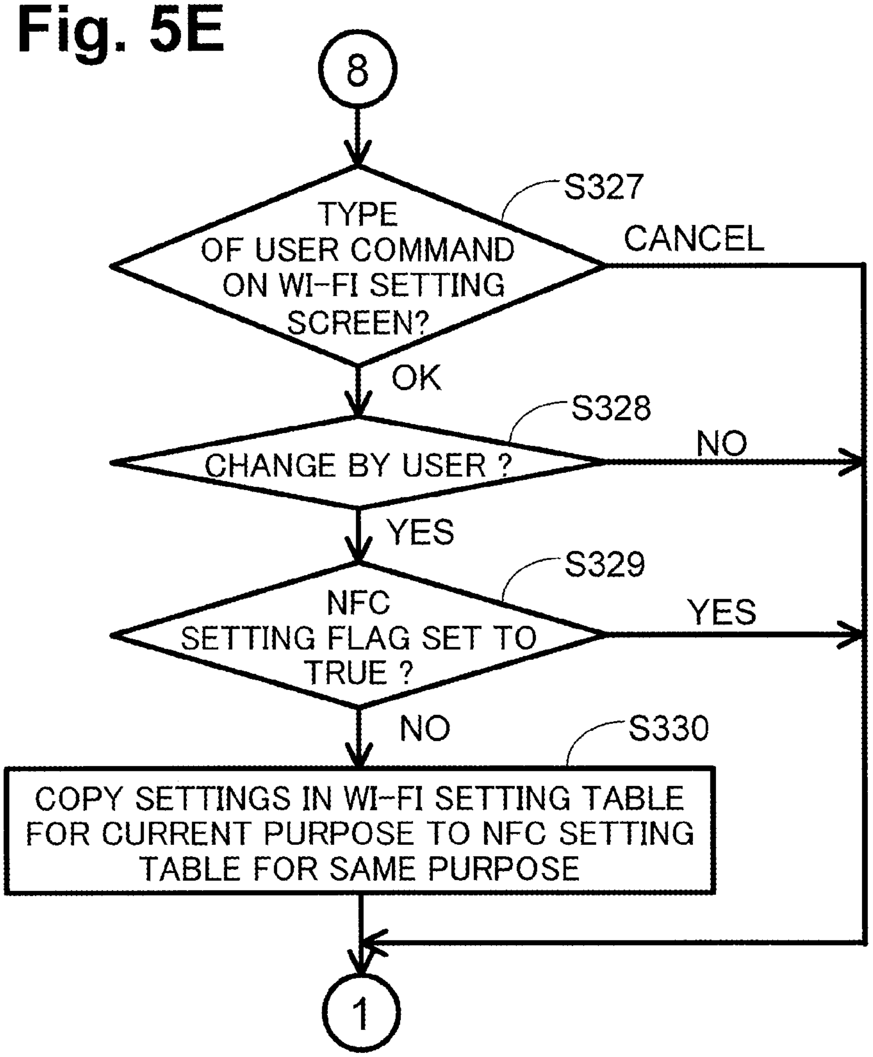

FIG. 2 schematically illustrates an example of how screens, in the first embodiment, displayed by the device control application 12_b_ on the LCD 16 are changed. When a purpose of printing is selected on a menu screen (not illustrated), which is displayed on the LCD 16 when the device control application 12_b_ is activated, and data to be printed (referred to below as print target data) is then selected on a target selection screen (not illustrated), a preview screen 50 is displayed. An image 51 based on the print target data selected on the target selection screen, the Print button 52, and a set button 53 are displayed on the preview screen 50.

The Print button 52 commands the printing of the image 51 displayed on the preview screen 50, that is, the image 51 based on the print target data selected by the user. Specifically, the Print button 52 commands the Wi-Fi printing of the image 51. When the Print button 52 is tapped, a print command is transmitted to the MFP 100 in wireless communication carried out by the wireless communication unit 23, that is, Fi-Wi communication. The command transmitted works as a trigger to start Wi-Fi printing.

When NFC communication is established between the terminal 10 and the MFP 100 by bringing the antenna (not illustrated) of the near-field communication unit 22 in the terminal 10 close to the antenna of the near field communication unit 122 in the MFP 100 with the preview screen 50 is displayed on the LCD 16, the image 51 is printed in NFC printing.

The set button 53 displays a Wi-Fi setting screen 60 on the LCD 16. When the set button 53 is tapped, the screen displayed on the LCD 16 is switched from the preview screen 50 to the Wi-Fi setting screen 60.

On the Wi-Fi setting screen 60, the setting of each item 41 included in the Wi-Fi setting table 12*d* or 12*e* is displayed. Specifically, when the model name of the MFP 100 on the distant site has been selected, the items 41 and their settings 42 corresponding to the selected purpose 40 in the Wi-Fi setting table 12*e* corresponding to the selected model name are displayed in a Wi-Fi setting display area 61. When the model name of the MFP 100 on the distant site has not been selected, the items 41 and their settings 42 corresponding to the selected purpose 40 in the default Wi-Fi setting table 12*d* are displayed in the Wi-Fi setting display area 61.

Besides the Wi-Fi setting display area 61, the Wi-Fi setting screen 60 includes an OK button 62, a Cancel button 63, and an NFC Setting button 64. In the Wi-Fi setting display area 61, the items 41 and their current settings 42 corresponding to the selected purpose 40 in the Wi-Fi setting table 12*d* or 12*e*, whichever is applicable, are displayed one item in one field 61*a*. In the example in FIG. 2, two fields 61*a* are allocated in the Wi-Fi setting display area 61, and the current settings 42 of two items 41 are displayed in these fields 61*a*.

When a field 61*a* is tapped, candidates (not illustrated) of the setting 42 of the item 41 corresponding to the tapped field 61*a* are displayed on the LCD 16 as choices. The user can change the current setting 42 by selecting a desired setting from the choices. Therefore, the user can change the settings 42 in the Wi-Fi setting tables 12*d* and 12*e* to desired values on the Wi-Fi setting screen 60.

The OK button 62 commands confirmation of the current settings 42 of the items 41 in the Wi-Fi setting tables 12*d* and 12*e*, including changes made after the Wi-Fi setting screen 60 has been displayed. The Cancel button 63 commands cancellation of changes, of settings 42, that are made after the Wi-Fi setting screen 60 has been displayed. When the OK button 62 or Cancel button 63 is tapped on the Wi-Fi setting screen 60, the screen displayed on the LCD 16 is switched from the Wi-Fi setting screen 60 to the preview screen 50.

An NFC Setting button 64 displays an NFC setting screen 70 on the LCD 16. When the NFC Setting button 64 is tapped, the screen displayed on the LCD 16 is switched from the Wi-Fi setting screen 60 to the NFC setting screen 70.

The NFC setting screen 70 includes an NFC Settings display area 71, an OK button 72, and a Cancel button 73. In the NFC Settings display area 71, the items 41 and their settings 42 corresponding to the selected purpose 40 in the NFC setting table 12*c* are displayed one item in one field 71*a*. In the example in FIG. 2, two fields 71*a* are allocated in the NFC Settings display area 71, and the current settings 42 of two items 41 are displayed in the these fields 71*a*.

When a field 71*a* is tapped, candidates (not illustrated) of the setting 42 of the item 41 corresponding to the tapped field 71*a* are displayed on the LCD 16 as choices. The user can change the current setting 42 by selecting a desired setting from the choices. The user can change the settings 42 in the NFC setting table 12*c* to desired values on the NFC setting screen 70 as in the case of the Wi-Fi setting screen 60 described above. Choices displayed as candidates of the setting 42 are a combination of settings suitable to the purpose 40. Since candidates suitable to the selected purpose 40 are displayed as choices, therefore, the user can set an appropriate setting according to the selected purpose 40.

The OK button 72 commands confirmation of the current settings 42 of the items 41 in the NFC setting table 12*c*, including changes made after the NFC setting screen 70 has been displayed. When the OK button 72 is tapped on the NFC setting screen 70*a* displayed by the tap of the NFC Setting button 64, the screen displayed on the LCD 16 is switched from the NFC setting screen 70 to the preview screen 50.

The Cancel button 73 commands cancellation of changes, of settings 42, that are made after the NFC setting screen 70 has been displayed. When the Cancel button 73 is tapped on the NFC setting screen 70 (70*a*) displayed by the tap of the NFC Setting button 64 on the Wi-Fi setting screen 60, the screen displayed on the LCD 16 return from the NFC setting screen 70 to the Wi-Fi setting screen 60, which has been previously displayed.

When NFC communication is established between the terminal 10 and the MFP 100 by bringing the terminal 10 close to the MFP 100 with the preview screen 50 displayed on the LCD 16, any current setting 42 in the NFC setting table 12*c* may be unavailable to the MFP 100 on the distant site, that is, the NFC setting table 12*c* may be inappropriate. In this case, an error screen 80 is displayed on the LCD 16 instead of the preview screen 50.

The error screen 80 includes a message 81 that prompts the NFC setting table 12*c* to be changed, a change button 82 with which the user indicates that the current setting will be changed, and a Cancel button 83 with which the user indicates that the current setting will not be changed. When the Cancel button 83 is tapped, the screen displayed on the LCD 16 is switched from the error screen 80 to the preview screen 50.

When the change button 82 is tapped, the screen displayed on the LCD 16 is switched from the error screen 80 to the NFC setting screen 70*b*. On the NFC setting screen 70*b*, prescribed settings included in a range available to the MFP 100 on the distant site are displayed, instead of the current settings 42, in the NFC setting table 12*c*, that are unavailable to the MFP 100 on the distant site.

On the NFC setting screen 70*b* displayed by the tap of the change button 82, an item 41 corresponding to a setting 42 unavailable to the MFP 100 on the distant site is displayed in the NFC Settings display area 71 in a different form from the other items 41. In the NFC setting screen 70*b* in the example in FIG. 2, the background of the field 71*a* including the sheet size, which is an item 41 corresponding to a setting 42 unavailable to the MFP 100 on the distant site, is colored so that the item 41 is distinguished from the other item 41. In FIG. 2, coloring is represented by hatching. The user can recognize at a glance an item 41 corresponding to a setting 42 that needs to be changed. Therefore, the user can change the setting 42 of the item 41 to a value available to the MFP 100 on the distant site.

When the OK button 72 or Cancel button 73 is tapped on the NFC setting screen 70*b*, the screen displayed on the LCD 16 is switched from the NFC setting screen 70 to the preview screen 50. Accordingly, the screen to which the NFC setting screen 70 is switched by the tap of the Cancel button 73 on the NFC setting screen 70 varies depending on whether the NFC setting screen 70 is the NFC setting screen 70*a*, which has been displayed by the tap of the NFC Setting button 64, or the NFC setting screen 70*b*, which has been displayed by the tap of the change button 82.

Since the NFC setting screen 70*b* is displayed without passing through the Wi-Fi setting screen 60, the user is less likely to change a setting 42 in the Wi-Fi setting tables 12*d* and 12*e* on the Wi-Fi setting screen 60 after the user has changed any setting 42 in the NFC setting table 12*c* on the NFC setting screen 70*b*. In the first embodiment, the screen to which the NFC setting screen 70*b* is switched by the tap of the Cancel button 73 is the preview screen 50 rather than the Wi-Fi setting screen 60, so it is possible to prevent a screen that is less likely to be used from being displayed.

By contrast, the NFC setting screen 70*a* is displayed from the Wi-Fi setting screen 60. After the user has changed any setting 42 in the NFC setting table 12*c* on the NFC setting screen 70*a*, therefore, the user may want to change a setting 42 in the Wi-Fi setting table 12*d* or 12*e* on the Wi-Fi setting screen 60. In the first embodiment, the screen to which the NFC setting screen 70*a* is switched by the tap of the Cancel button 73 is the Wi-Fi setting screen 60, so the user can change settings 42 in the Wi-Fi setting tables 12*d* and 12*e*.

FIGS. 3A-3E illustrate a flowchart of printing processing. The printing processing is executed by the CPU 11 in the terminal 10 under control by the device control application 12*b*. The printing processing is started when a purpose of printing is selected on a menu screen (not illustrated) and print target data is then selected on a target selection screen (not illustrated). The CPU 11 displays the preview screen 50 on the LCD 16 (S301) and places the processing on standby (the result in S302 is No, the result in S315 is No, and the result in S324 is No). The image 51 displayed on the preview screen 50 in S301 is an image based on the print target data, the setting tables 12*c* to 12*e* not being reflected in the image.

When NFC printing is started with the preview screen 50 displayed, that is, NFC is established between the terminal 10 and the MFP 100 (the result in S302 is Yes), the CPU 11 obtains a model name received from the MFP 100 on the distant site through NFC communication (S303). Next, the CPU 11 determines whether a specific item in the items 41 in the NFC setting table 12*c* has a setting that is unavailable to MFPs 100 corresponding to some model names (the setting is referred to below as the specific value) (S304).

If the CPU 11 determines that a specific item in the NFC setting table 12*c* has a specific value (the result in S304 is Yes), the CPU 11 causes the processing to proceed to S305. When, for example, MFPs 100, corresponding to some model names, to which the device control application 12*b* is adaptable, cannot use A3 sheet, if the sheet size in the NFC setting table 12*c* is set to A3, the CPU 11 make an affirmative determination in S304 and causes the processing to proceed to S305.

In S305, the CPU 11 determines whether the MFP 100 on the distant site is stored in the flash memory 12 as the device information 12*f* (S305). The CPU 11 makes a determination in S305 according to the model name obtained in S303. If the model name obtained in S303 has not been stored as the device information 12*f*, the CPU 11 makes a negative result in S305. If the CPU 11 makes a negative result in S305 (the result in S305 is No), the CPU 11 performs NFC communication to request the MFP 100 on the distant site to transmit its specification information, receives the specification information transmitted from the MFP 100 in response to the request, and obtains the specification information (S306). If the CPU 11 makes an affirmative determination in S305 (the result in S305 is Yes), the CPU 11 obtains specification information, corresponding to the model name, that has been stored as the device information 12*f* (S310).

Upon completion of the processing in S306 or S310, the CPU 11 determines whether the current setting 42 in the NFC setting table 12*c* is available to the MFP 100 on the distant site (S307). Specifically, the CPU 11 first obtains a range settable for the current purpose, that is, the purpose selected on the menu screen, according to the capacity of the MFP 100 on the distant site, the capacity being indicated in the specification information obtained from MFP 100 on the distant site or the device information 12*f*. The CPU 11 then determines whether the current setting 42 in the NFC setting table 12*c* falls into the obtained range. If the CPU 11 determines the current setting 42 falls into the obtained range, the CPU 11 makes an affirmative determination in S307.

If the CPU 11 makes an affirmative determination in S307 (the result in S307 is Yes), the CPU 11 executes processing to wirelessly connect the wireless communication unit 23 and the wireless communication unit 123 in the MFP 100 to each other (handover processing) in an ad hoc mode (S308). Specifically, as a wireless setting to perform Wi-Fi communication through the wireless communication unit 23, the CPU 11 sets a service set identifier (SSID) received from the MFP 100 through NFC communication, after which the CPU 11 makes a wireless connection by Wi-Fi.

Next, the CPU 11 executes printing execution processing (S309), terminating the printing processing in the first embodiment. Specifically, in printing execution processing (S309), the CPU 11 transmits print target data, the NFC setting table 12*c* for the current purpose, and a print command to the MFP 100 on the distant site, that is, the MFP 100 at the connection destination in the handover processing in S308, in Wi-Fi communication carried out through the wireless communication unit 23 in the ad hoc mode. The print target data and the NFC setting table 12*c* for the current purpose may be combined into a single piece of data or before being transmitted to the MFP 100 or may be transmitted separately to the MFP 100. Alternatively, in the printing execution processing in S309, the CPU 11 may create print data from the print target data and the NFC setting table 12*c* for the current purpose and may transmit the created print data to the MFP 100.

In the processing in S304 to S310, printing execution processing in S309 is executed when the current setting 42 in the NFC setting table 12*c* is available to the MFP 100 on the distant site, so it is possible to prevent the printing execution processing from being executed by using an NFC setting table 12*c* unavailable to the MFP 100 on the distant site.

If the model name of the MFP 100 on the distant site has been stored as part of the device information 12*f*, the specification information included in the device information 12*f* in correspondence to the model name is used, instead of obtaining the specification information through NFC communication, to determine whether the current setting 42 in the NFC setting table 12*c* is available to the MFP 100 on the distant site. Therefore, the specification information is obtained from the MFP 100 on the distant site only when the model name is not included in the device information 12*f*, so time taken in communication to obtain the specification information is shortened accordingly.

Furthermore, since processing in S305 to S307 and S310 are executed when the specific item in the NFC setting table 12*c* has a specific value, it is possible to reliably prevent the printing execution processing from being executed by using an NFC setting table 12*c* unavailable to the MFP 100 on the distant site. If the specific item in the NFC setting table 12*c* has no specific value, that is, the settings 42 of all items 41 in the NFC setting table 12*c* are available to all MFPs 100, the printing execution processing in S309 is performed without processing in S305 to S307 and S310 being performed, a processing load on the CPU 11 and time taken to perform the processing can be minimized.

Returning to the description of the flowchart, if the CPU 11 determines in S307 that the current setting 42 in the NFC setting table 12*c* is unavailable to the MFP 100 on the distant site (the result in S307 is No), the CPU 11 switches the screen on the LCD 16 from the preview screen 50 to the error screen 80 (S311). If the CPU 11 recognizes that the touch panel 17 has detected a tap of the Cancel button 83 on the error screen 80 (the result in S312 is "cancel"), the CPU 11 causes the processing to return to S301 and switches the screen on the LCD 16 from the error screen 80 to the preview screen 50.

If the CPU 11 recognizes that the touch panel 17 has detected a tap of the change button 82 on the error screen 80 (the result in S312 is "change"), the CPU 11 switches the screen on the LCD 16 from the preview screen 50 to the NFC setting screen 70 (70*b*) (S313). In S313, the CPU 11 switches the current settings 42, displayed in the NFC Settings display area 71, for the current purpose in the NFC setting table 12*c* to a prescribed setting included in a range settable for the current purpose, the prescribed setting being suitable for the capacity of the MFP 100 on the distant site. The CPU 11 displays an item 41 corresponding to a setting 42 unavailable to the MFP 100 on the distant site in a different form from the other items 41. For example, the CPU 11 colors the background of a field 71*a* that includes an item 41 corresponding to a setting 42 unavailable to the MFP 100 on the distant site.

While the NFC setting screen 70 is being displayed, the user can change the settings 42 for the current purpose in the NFC setting table 12*c* to desired values. On the NFC setting screen 70 (70*b*) displayed in the processing in S313, a range settable for the setting 42 of each item 41 is not the default setting range on the NFC setting table 12*c* but is a range suitable for the capacity obtained in S306 or S310 and the current purpose. When the user changes a setting 42 on the NFC setting screen 70*b*, therefore, the user can set a new value for the setting 42 within the range of the capacity of the MFP 100 on the distant site.

If the CPU 11 recognizes that the touch panel 17 has detected a tap of the Cancel button 73 on the NFC setting screen 70 (70*b*) (the result in S314 is "cancel"), the CPU 11 causes the processing to return to S301 and switches the screen on the LCD 16 from the NFC setting screen 70 to the preview screen 50. If the CPU 11 recognizes that the touch panel 17 has detected a tap of the OK button 72 on the NFC setting screen 70 (70*b*) (the result in S314 is OK) and the user has not changed any setting 42 in the NFC setting table 12*c* (the result in S321 is No), the CPU 11 causes the processing to return to S301 and switches the screen on the LCD 16 from the NFC setting screen 70 to the preview screen 50.

If the user has changed any setting 42 in the NFC setting table 12*c* (the result in S321 is Yes), the CPU 11 sets an NFC setting flag (not illustrated) to True (S322) and causes the processing to return to S301. The NFC setting flag, which is provided in the RAM 13, indicates whether the user has changed the setting 42 in the NFC setting table 12*c*. The NFC setting flag is set to False at the time of the installation of the device control application 12*b*. If the NFC setting flag is set to False, it indicates that the setting 42 in the NFC setting table 12*c* remain unchanged from the time of the installation of the device control application 12*b*. If the NFC setting flag is set to True, it indicates that the setting 42 in the NFC setting table 12*c* is a value set by the user.

If the CPU 11 recognizes that the touch panel 17 has detected a tap of the set button 53 on the preview screen 50 (the result in S302 is No and the result in S315 is Yes) and the type of the MFP 100 on the distant site (in the first embodiment, the model name,) has been selected (the result in S316 is Yes), the CPU 11 switches the screen on the LCD 16 from the preview screen 50 to the Wi-Fi setting screen 60 (S323). On the Wi-Fi setting screen 60 displayed in the processing in S323, the current settings 42 for the current purpose in the Wi-Fi setting table 12*e* corresponding to the selected type are displayed in the Wi-Fi setting display area 61.

If the type of the MFP 100 on the distant site has not been selected (the result in S316 is No), the CPU 11 switches the screen on the LCD 16 from the preview screen 50 to the Wi-Fi setting screen 60 (S317). On the Wi-Fi setting screen 60 displayed in the processing in S317, the current settings 42 for the current purpose in the default Wi-Fi setting table 12*d* are displayed in the Wi-Fi setting display area 61.

While the Wi-Fi setting screen 60 is being displayed, the user can change settings 42 for the current purpose in the default Wi-Fi setting table 12*d* or device-specific Wi-Fi setting table 12*e* to desired values. A range settable for the setting 42 of each item 41 varies depending on whether the Wi-Fi setting screen 60 has been displayed in the processing in S317 or in the processing in S323. Specifically, on the Wi-Fi setting screen 60 displayed without the type of the MFP 100 on the distant site being selected, a range settable for the setting 42 of each item 41 is determined according to the default setting range for the Wi-Fi setting table 12*d* and the current purpose. On the Wi-Fi setting screen 60 displayed with the type of the MFP 100 on the distant site selected, a range settable for the setting 42 of each item 41 is determined according to the specification information included in the device information 12*f* and the current purpose.

If the CPU 11 recognizes that the touch panel 17 has detected a tap of the NFC Setting button 64 on the Wi-Fi setting screen 60 (the result in S318 is Yes), the CPU 11 switches the screen on the LCD 16 from the Wi-Fi setting screen 60 to the NFC setting screen 70 (70*a*) (S319). In S319, the CPU 11 displays the current settings 42 for the current purpose in the NFC setting table 12*c* in the NFC Settings display area 71. While the NFC setting screen 70 is being displayed, the user can change the settings 42 for the current purpose in the NFC setting table 12*c* to desired values. On the NFC setting screen 70 (70*a*) displayed in the processing in S319, a range settable for the setting 42 of each item 41 is the default setting range in the NFC setting table 12*c* and a range determined according to the current purpose.

If the CPU 11 recognizes that the touch panel 17 has detected a tap of the Cancel button 73 on the NFC setting screen 70 (70*a*) (the result in S320 is "cancel"), the CPU 11 causes the processing to proceed to S316, switching the screen on the LCD 16 from the NFC setting screen 70 to the Wi-Fi setting screen 60.

If the CPU 11 recognizes that the touch panel 17 has detected a tap of the OK button 72 on the NFC setting screen 70 (70*a*) (the result in S320 is OK) and the user has not changed any setting 42 in the NFC setting table 12*c* (the result in S321 is No), the CPU 11 causes the processing to return to S301 and switches the screen on the LCD 16 from the NFC setting screen 70 to the preview screen 50. If the user has changed any setting 42 in the NFC setting table 12*c*

(the result in S321 is Yes), the CPU 11 sets the NFC setting flag to True (S322) and causes the processing to return to S301.

If the CPU 11 recognizes that the touch panel 17 has detected a tap of the Cancel button 63 on the Wi-Fi setting screen 60 (the result in S318 is No and the result in S327 is "cancel"), the CPU 11 causes the processing to return to S301 and switches the screen on the LCD 16 from the Wi-Fi setting screen 60 to the preview screen 50.

If the CPU 11 recognizes that the touch panel 17 has detected a tap of the OK button 62 on the Wi-Fi setting screen 60 (the result in S327 is OK) and the user has not changed any setting 42 in the Wi-Fi setting table 12*d* or 12*e* (the result in S328 is No), the CPU 11 causes the processing to return to S301. If the user has changed any setting 42 in the Wi-Fi setting table 12*d* or 12*e* and the NFC setting flag is set to False (the result in S328 is Yes and the result in S329 is No), the CPU 11 copies the current settings 42, in the Wi-Fi setting table 12*d* for the current purpose, that have been displayed on the Wi-Fi setting screen 60 in S317 or the current settings 42, in the Wi-Fi setting table 12*e* for the current purpose, that have been displayed on the Wi-Fi setting screen 60 in S323 to the NFC setting table 12*c* for the same purpose (S330) and causes the processing to proceed to S301. If the NFC setting flag is set to True (the result in S329 is Yes), the CPU 11 causes the processing to return to S301.

In the processing in S329 and S330, the settings that the user has set for Wi-Fi printing are automatically set as the settings 42 in the NFC setting table 12*c* when the settings in the NFC setting table 12*c* remain unchanged from the time of the installation of the device control application 12*b*. This enables the user to easily make settings for NFC printing. Particularly, if the NFC setting flag is set to True, that is, the user has intentionally set the NFC setting table 12*c*, the processing in S330 is not executed, so it is possible to prevent the intentionally set NFC setting table 12*c* from being intentionally changed.

If Wi-Fi printing is started with the preview screen 50 displayed, that is, the CPU 11 recognizes that the touch panel 17 has detected a tap of the Print button 52 on the preview screen 50 (the result in S315 is No and the result in S324 is Yes), the CPU 11 executes printing execution processing as in S309 (S325), terminating the printing processing in the first embodiment. Settings used in printing execution processing in S325 are settings in the Wi-Fi setting tables 12*d* or 12*e* for the current purpose, whichever is applicable depending on whether the type of the MFP 100 on the distant site has been selected.

In the first embodiment described above, printing settings specific to NFC printing and printing settings specific to Wi-Fi printing, that is, the NFC setting table 12*c* and Wi-Fi setting tables 12*d* and 12*e* are selectively used depending on whether communication that works as a trigger to use the print function of the MFP 100 is near-field wireless communication carried out by the near-field communication unit 22 or wireless communication carried out by the wireless communication unit 23. Therefore, appropriate printing settings can be used by using the device control application 12*b* in both NFC printing and Wi-Fi printing.

Although, in the first embodiment described above, the sheet size has been used as an example of the specific item, an item to set monochrome printing or color printing, an item to set one-sided printing or double-sided printing, and other items can be used as specific items.

Next, a second embodiment of the present invention will be described with reference to FIGS. 4A-4E. In the second embodiment, the same elements as in the first embodiment described above will be given the same reference characters and a duplicate description will be omitted. FIGS. 4A-4E illustrate a flowchart of printing processing in the second embodiment. Processing in each step in the flowchart in FIGS. 4A-4E is executed by the CPU 11 under control by the device control application 12*b* in the second embodiment.

Differences from the printing processing (see FIGS. 3A-3E) in the first embodiment will be mainly described. The second embodiment differs from the first embodiment in that if any setting 42 in the NFC setting table 12*c* is changed by the user, the new value of the setting 42 in the NFC setting table 12*c* is copied to the device-specific Wi-Fi setting table 12*e* under a prescribed condition.

Specifically, after the CPU 11 has executed the processing in S322, if the type of the MFP 100 on the distant site has been selected and the new value of the setting 42 in the NFC setting table 12*c* is available to the selected MFP 100 on the distant site (the result S401 is Yes and the result in S402 is Yes), the CPU 11 copies the current setting 42 in the NFC setting table 12*c* for the current purpose (that is, the new value of the setting 42) to the Wi-Fi setting table 12*e*, for the same purpose, corresponding to the selected MFP 100 (S403) and causes the processing to return to S301. If the type of the MFP 100 on the distant site has not been selected (the result S401 is No) or the new value of the setting 42 in the NFC setting table 12*c* is unavailable to the selected MFP 100 on the distant site (the result in S402 is No), the CPU 11 causes the processing to return to S301 without executing the processing in S403.

In the processing in the steps described above, the user can easily make settings in Wi-Fi printing. Particularly, if the new value of the setting 42 in the NFC setting table 12*c* cannot be set in the selected MFP 100 on the distant site, the processing in S403 is not executed, so it is possible to prevent A3 from being set as the sheet size in an MFP 100 that cannot use A3 as the sheet size.

Next, a third embodiment of the present invention will be described with reference to FIGS. 5A-5E. In the third embodiment, the same elements as in the first embodiment described above will be given the same reference characters and a duplicate description will be omitted. FIGS. 5A-5E illustrate a flowchart of printing processing in the third embodiment. Processing in each step in the flowchart in FIGS. 5A-5E is executed by the CPU 11 under control by the device control application 12*b* in the third embodiment.

Differences from the printing processing (see FIGS. 3A-3E) in the first embodiment will be mainly described. In the first embodiment, only one NFC setting table 12*c* has been used in NFC printing without consideration of the printing method executed by the MFP 100, which is a device. In the third embodiment, however, an NFC setting table 12*c* is selectively used depending on whether the printing method executed by the device is an inkjet method or a laser method. That is, an NFC setting table 12*c* is selectively used depending on whether the printer unit 124 of the MFP 100 is an inkjet printer or a laser printer. Accordingly, the NFC setting table 12*c* in the third embodiment includes both settings for a device that uses an inkjet method as the printing method and settings for a device that uses a laser method as the printing method.

Specifically, after the processing in S303, the CPU 11 obtains an engine type received from the MFP 100 on the distant site through NFC communication (S501). Whether the printing method executed by the MFP 100 is an inkjet method or a laser method can be determined by the engine type. Therefore, if the CPU 11 recognizes a tap of the NFC Setting button 64 (the result in S318 is Yes), the CPU 11 determines the printing method executed by the MFP 100 on the distant site according to the engine type obtained in S501 (S502).

If the CPU 11 determines that the printing method is an inkjet method (the result in S502 is "ink"), the CPU 11 switches the screen on the LCD 16 from the Wi-Fi setting screen 60 to the NFC setting screen 70 (S503). In S503, the CPU 11 displays, on the NFC Settings display area 71, the current settings 42 for the current purpose in the NFC setting table 12*c* intended for the inkjet method. On the NFC setting screen 70 displayed in S503, a range settable for the setting 42 of each item 41 is the default setting range in the NFC setting table 12*c* intended for the inkjet method and a range determined according to the current purpose.

If the CPU 11 determines that the printing method is a laser method (the result in S502 is "laser"), the CPU 11 switches the screen on the LCD 16 from the Wi-Fi setting screen 60 to the NFC setting screen 70 (S504). In S504, the CPU 11 displays, on the NFC Settings display area 71, the current settings 42 for the current purpose in the NFC setting table 12*c* intended for the laser method. On the NFC setting screen 70 displayed in S504, a range settable for the setting 42 of each item 41 is the default setting range in the NFC setting table 12*c* intended for the laser method and a range determined according to the current purpose.

In the third method described above, an NFC setting table 12*c* suitable to a printing method executed by the device on the distant site (in the third embodiment, the MFP 100) can be used to execute NFC printing. For example, as for a device in a laser method, printing on glossy paper is not generally assumed, so glossy paper is eliminated from the setting range of the settings 42 of the sheet type in the items 41 in NFC setting table 12*c* intended for laser method, enabling NFC printing in which an NFC setting table 12*c* suitable to the device in the laser method is used.

Next, a fourth embodiment of the present invention will be described with reference to FIGS. 6 and 7. In the first embodiment described above, a purpose of printing has been selected from the menu screen (not illustrated) common to Wi-Fi printing and NFC printing, regardless of whether either of them is executed. In the fourth embodiment, however, different menu screens, on which a purpose of printing is selected, are provided for Wi-Fi printing and NFC printing. In the fourth embodiment, the same elements as in the first embodiment described above will be given the same reference characters and a duplicate description will be omitted.

Figure 6:
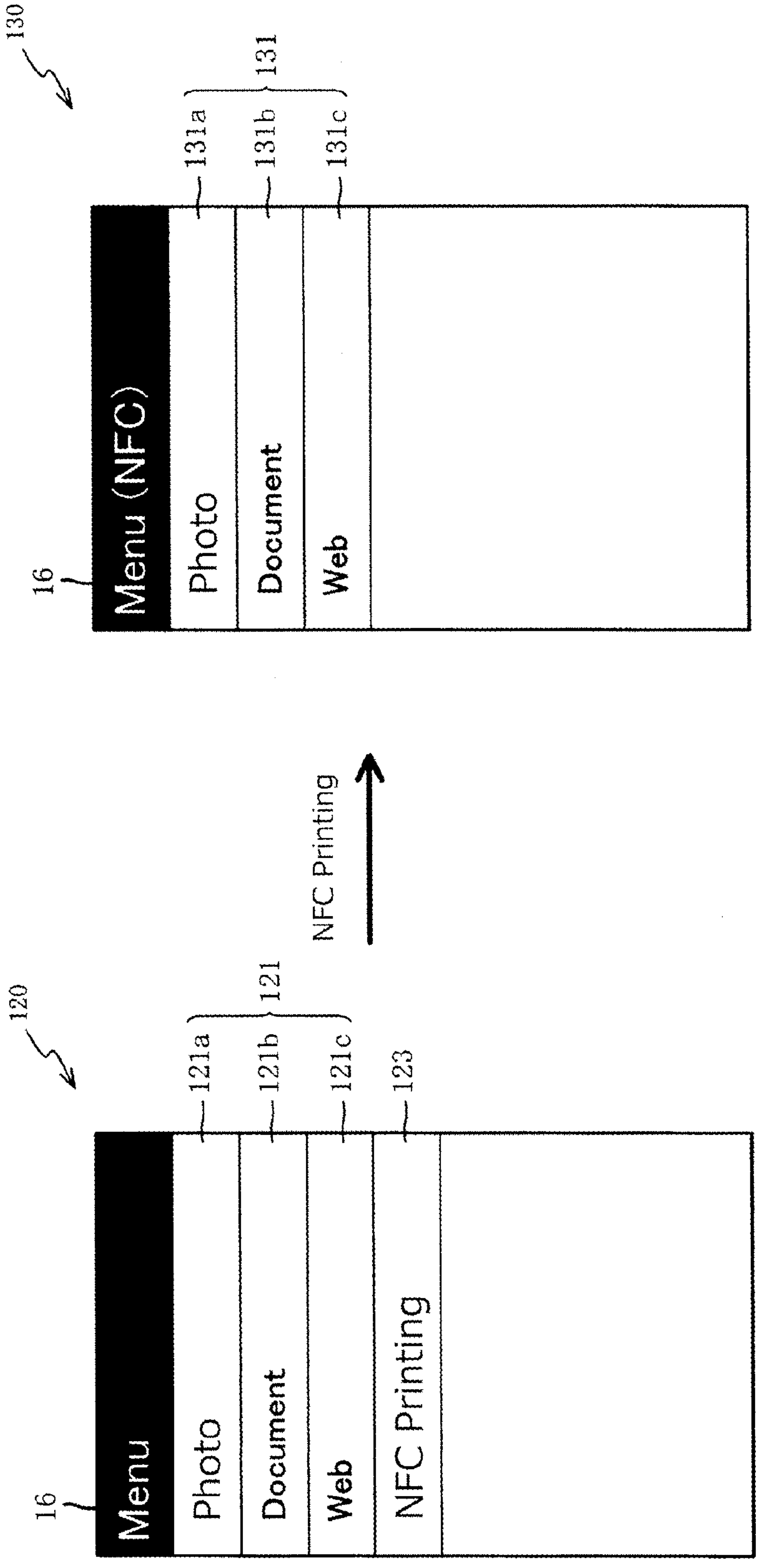
FIG. 6 schematically illustrates menu screens in a fourth embodiment.

FIG. 6 schematically illustrates menu screens in the fourth embodiment. A menu screen 120 is intended for Wi-Fi printing. The menu screen 120 is displayed on the LCD 16 when the device control application 12*b* in the fourth embodiment is activated. The menu screen 120 includes buttons 121 to select a purpose of Wi-Fi printing. In the example in FIG. 6, the buttons 121 includes a button 121*a* to select printing of a photo, a button 121*b* to select printing of a document, and a button 121*c* to select printing of a Web page. The menu screen 120 also includes a button 122 to command the use of NFC printing.

When any one of the buttons 121*a* to 121*c* is tapped, a purpose of Wi-Fi printing is selected in correspondence to the tapped button 121 and the screen on the LCD 16 is switched from the menu screen 120 to a target selection screen (not illustrated). When the button 122 is tapped, the screen on the LCD 16 is switched from the menu screen 120 to a menu screen 130 intended for NFC printing.

The menu screen 130 includes buttons 131 to select a purpose of NFC printing. In the example in FIG. 6, the buttons 131 are buttons 131*a* to 131*c* similar to the buttons 121*a* to 121*c*. When any one of the buttons 131*a* to 131*c* is tapped, a purpose of NFC printing is selected in correspondence to the tapped button 131 and the screen on the LCD 16 is switched from the menu screen 120 to a target selection screen.

Figure 7A:
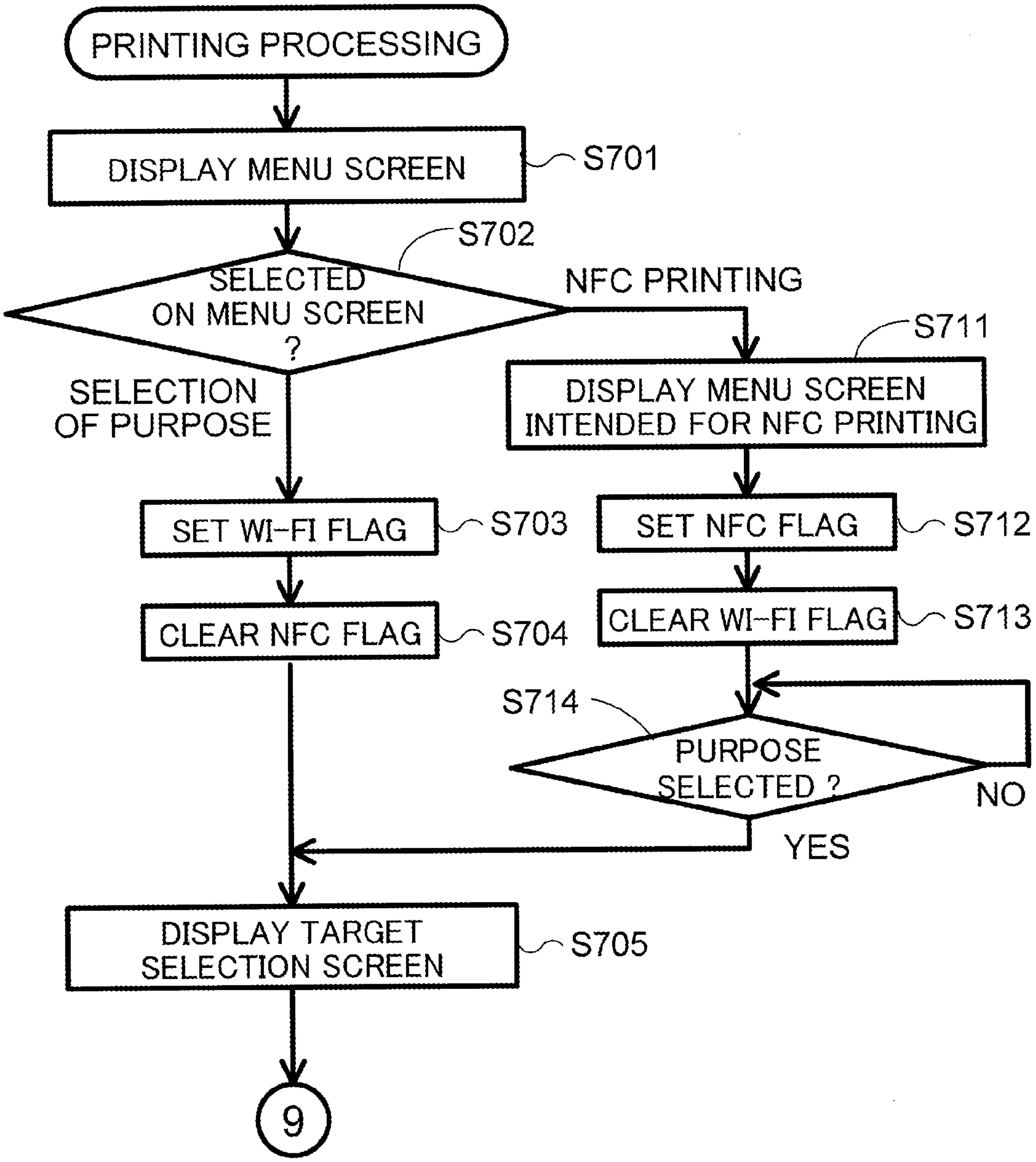
FIGS. 7A and 7B illustrate a flowchart of printing processing in the fourth embodiment.
Figure 7B:
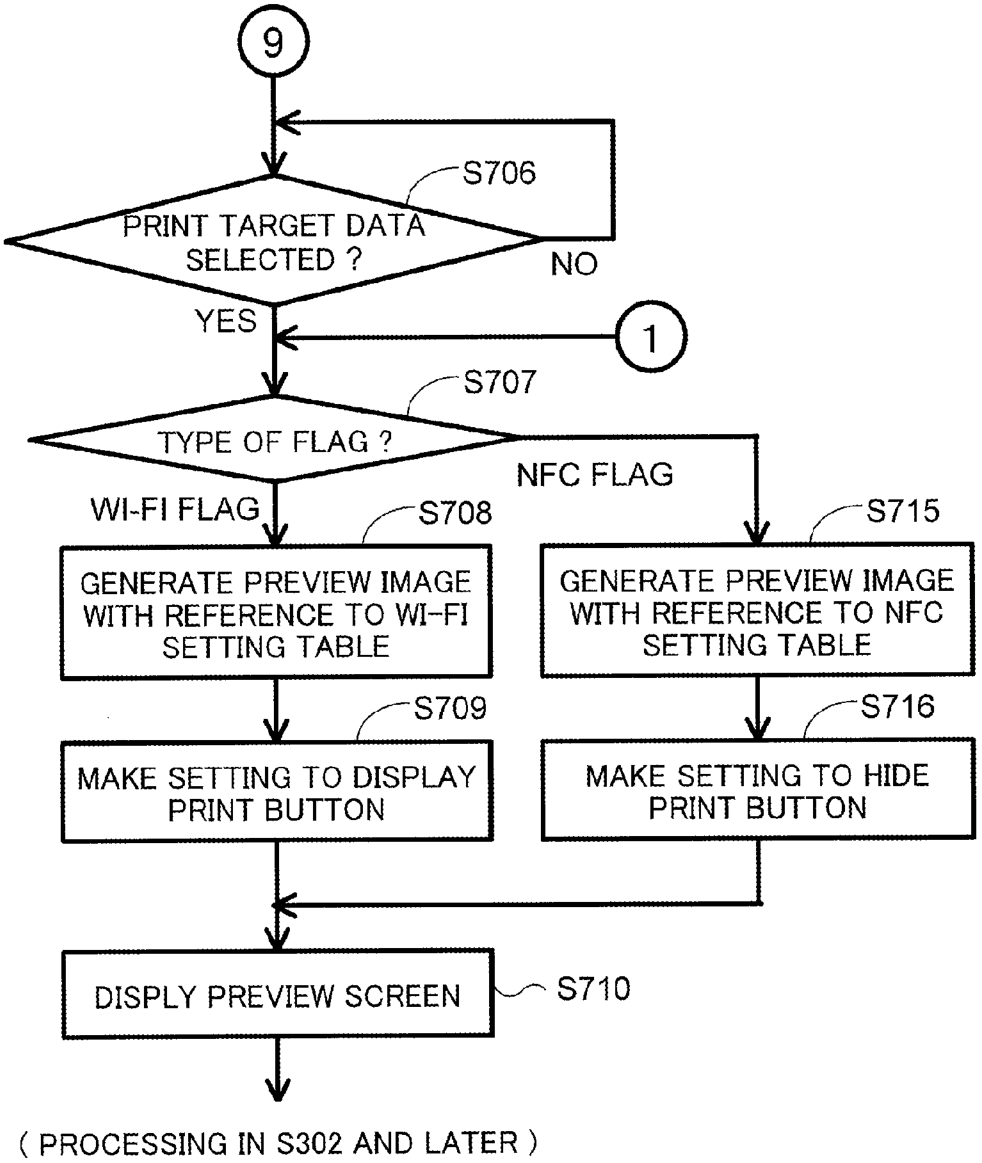

FIGS. 7A and 7B illustrate a flowchart of printing processing in the fourth embodiment. Processing in each step in the flowchart in FIGS. 7A and 7B is executed by the CPU 11 under control by the device control application 12*b* in the fourth embodiment. Differences from the printing processing (see FIGS. 3A-3E) in the first embodiment will be mainly described. Printing processing in the fourth embodiment is started when the device control application 12*b* is activated. The CPU 11 displays the menu screen 120 on the LCD 16 (S701).

If the CPU 11 recognizes a tap of any one of the buttons 121*a* to 121*c* is tapped, that is, the user selects a purpose of Wi-Fi printing (the result in S702 is "selection of purpose"), the CPU 11 sets a Wi-Fi flag (not illustrated) (S703) and clears an NFC flag (not illustrated) (S704). The Wi-Fi flag and NFC flag are provided in the RAM 13. The Wi-Fi flag indicates whether a purpose of Wi-Fi printing has been selected on the menu screen 120. When the Wi-Fi flag is set, it indicates that a purpose of Wi-Fi printing has been selected. The NFC flag indicates whether a purpose of NFC printing has been selected on the menu screen 130. When the NFC flag is set, it indicates that a purpose of NFC printing has been selected. Upon completion of processing in S704, the CPU 11 switches the screen on the LCD 16 from the menu screen 120 to a target selection screen (not illustrated) (S705).

If the CPU 11 recognizes a tap of the button 122 (the result in S702 is "NFC printing"), the CPU 11 switches the screen on the LCD 16 from the menu screen 120 to the menu screen 130 intended for NFC printing (S711). The CPU 11 sets the NFC flag (not illustrated) (S712) and clears the Wi-Fi flag (not illustrated) (S713). Next, the CPU 11 waits until the user selects a purpose of NFC printing (the result in S714 is No). If the CPU 11 recognizes a tap of any one of the buttons 131*a* to 131*c* (the result in S714 is Yes), the CPU 11 switches the screen on the LCD 16 from the menu screen 130 to a target selection screen (S705).

If the target selection screen is displayed in S705, the CPU 11 waits until the user selects print target data (the result in S706 is No). If the user selects print target data (the result in S706 is Yes), the CPU 11 determines which of the Wi-Fi flag and NFC flag has been set (S707).

If the CPU 11 determines that the Wi-Fi flag has been set (the result in S707 is "Wi-Fi flag"), the CPU 11 creates an image 51 as a preview image with reference to the Wi-Fi setting table 12*d* or 12*e* (S708). Specifically, if the model name of the MFP 100 on the distant site has not been selected, the CPU 11 creates the image 51 by using the default Wi-Fi setting table 12*d*. If the model name of the MFP 100 on the distant site has been selected, the CPU 11 creates the image 51 by using the Wi-Fi setting table 12*e* corresponding to the selected MFP 100. The CPU 11 then makes a setting so that the Print button 52 is displayed (S709) and switches the screen on the LCD 16 from the target selection screen to the preview screen 50 (S710).

Therefore, if a purpose of Wi-Fi printing is selected on the menu screen 120, the preview screen 50 that includes the Print button 52 and the image 51 created by using the Wi-Fi setting table 12*d* or the relevant Wi-Fi setting table 12*e* is displayed on the LCD 16. On the preview screen 50, the user can check a result of Wi-Fi printing by viewing the image 51. The user can start Wi-Fi printing by tapping the Print button 52 displayed on the preview screen 50.

If the CPU 11 determines that the NFC flag has been set (the result in S707 is "NFC flag"), the CPU 11 creates an image 51 as a preview image with reference to the NFC setting table 12*c* (S715). The CPU 11 then makes a setting so that the Print button 52 is not displayed (S716) and switches the screen on the LCD 16 from the target selection screen to the preview screen 50 (S710). Therefore, if a purpose of NFC printing is selected on the menu screen 130, the preview screen 50 that includes the image 51 created by using the NFC setting table 12*c* is displayed on the LCD 16. On the preview screen 50, the user can check a result of NFC printing by viewing the image 51. Since the Print button 52 is not displayed on the preview screen 50 displayed when a purpose of NFC printing is selected, it is possible for a user who wants to execute NFC printing from selecting Wi-Fi printing by mistake. The image 51 displayed on the preview screen 50 in S710 is an image, based on the print target data, in which the NFC setting table 12*c*, Wi-Fi setting table 12*d*, or Wi-Fi setting table 12*e* is reflected. Upon completion of the processing in S710, the CPU 11 executes the processing in S302 to S330 in FIGS. 3A to 3E.

Since, in the fourth embodiment described above, different menu screens, on which a purpose of printing is selected, are provided for Wi-Fi printing and NFC printing, the user can pay attention whether the intended printing is Wi-Fi printing or NFC printing when the user selects a purpose of printing.

In the fourth embodiment described above, if the preview screen 50 is displayed in S710 on the basis that a purpose of NFC printing has been selected on the menu screen 130, when the set button 53 on the preview screen 50 is tapped, the NFC setting screen 70 may be displayed instead of the Wi-Fi setting screen 60.

Next, a fifth embodiment of the present invention will be described with reference to FIGS. 8 to 10. In the fourth embodiment described above, the user has been given a choice to select Wi-Fi printing or NFC printing on the menu screen 120 intended for Wi-Fi printing. In the fifth embodiment, however, the user can select Wi-Fi printing or NFC printing on a device setting screen 160, which is displayed on the LCD 16 when the set button 53 is tapped. In the fifth embodiment, the same elements as in the first embodiment described above will be given the same reference characters and a duplicate description will be omitted.

Figure 8:
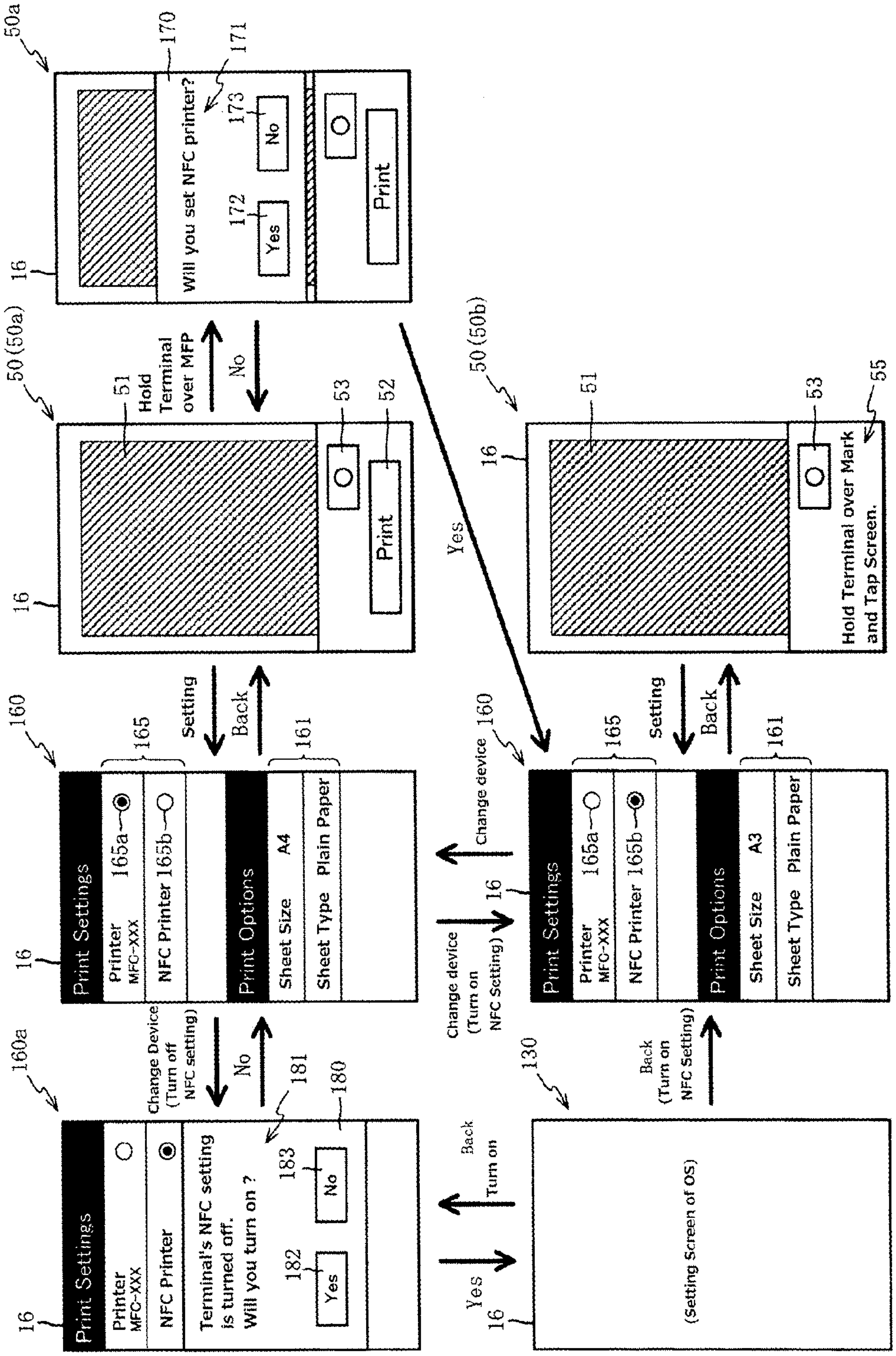
FIG. 8 schematically illustrates an example of how screens in a fifth embodiment are changed.

FIG. 8 schematically illustrates an example of how screens displayed by the device control application 12*b* in the fifth embodiment on the LCD 16 are changed. The preview screen 50 in the fifth embodiment is a preview screen 50*a* intended for Wi-Fi printing or a preview screen 50*b* intended for NFC printing. The preview screen 50*a* intended for Wi-Fi printing is displayed on the LCD 16 when Wi-Fi printing has been selected. The preview screen 50*b* intended for NFC printing is displayed on the LCD 16 when NFC printing has been selected.

As illustrated in FIG. 8, on the preview screen 50*a* intended for Wi-Fi printing, the image 51, Print button 52, and set button 53 are displayed. The preview screen 50*b* intended for NFC printing is the same as the preview screen 50*a* intended for Wi-Fi printing except that a message 55 that prompts for a manipulation to start NFC printing is displayed instead of the Print button 52, which does not need to be tapped in NFC printing. When the preview screen 50*b* intended for NFC printing is displayed on the LCD 16, therefore, the user can know a manipulation to start NFC printing from the message 55. Since the preview screen 50*b* intended for NFC printing lacks the Print button 52 unlike the preview screen 50*a* intended for Wi-Fi printing, it is possible for a user who wants to execute NFC printing from selecting Wi-Fi printing by mistake.

When the set button 53 on the preview screen 50 (50*a* or 50*b*) is tapped, the screen on the LCD 16 is switched from the preview screen 50 to the device setting screen 160. On the device setting screen 160, which of a device intended for Wi-Fi printing and a device intended for NFC printing is to be used is set. In the descriptions below, a device intended for Wi-Fi printing will be referred to as a Wi-Fi device and a device intended for NFC printing will be referred to as an NFC device.

The device setting screen 160 includes a device setting area 165 in which a device to be used is set. The device setting area 165 includes a radio button 165*a* corresponding to a Wi-Fi device and a radio button 165*b* corresponding to an NFC device. When using the Wi-Fi device, the user can set it as the device to be used by checking the radio button 165*a*. When using the NFC device, the user can set it as the device to be used by checking the radio button 165*b*. When the Wi-Fi device is set, Wi-Fi printing is executed by using the device. When the NFC device is set, NFC printing is executed by using the device. That is, the device setting screen 160 works as a screen on which to select Wi-Fi printing or NFC printing.

When the set button 53 on the preview screen 50*a* is tapped, the Wi-Fi device is set at that time, so the device setting screen 160 with the radio button 165*a* checked is displayed. When the set button 53 on the preview screen 50*b* is tapped, the device setting screen 160 with the radio 165*b* checked is displayed.

The device setting screen 160 includes a setting display area 161. The display in the setting display area 161 varies depending on whether the radio button 165*a* or radio button 165*b* is checked. Specifically, when the radio button 165*a* is checked, items for the selected purpose and their settings in the Wi-Fi setting table 12*d* or 12*e* are displayed in the setting display area 161 as on the Wi-Fi setting screen 60 in the first embodiment. When the radio button 165*b* is checked, items for the selected purpose and their current settings in the NFC setting table 12*c* are displayed in the setting display area 161 as on the NFC setting screen 70 in the first embodiment. When the user manipulates a Back button, which is one of the manipulation keys 15, with the device setting screen 160 displayed, the screen displayed on the LCD 16 is switched from the device setting screen 160 to the preview screen 50*a* or preview screen 50*b*, whichever is applicable depending on whether the radio button 165*a* or 165*b* is checked.

The user can switch the device to be used to the Wi-Fi device by unchecking the radio button 165*b* and checking the radio button 165*a* on the device setting screen 160. When the checked radio button is switched from the radio button 165*b* to the radio button 165*a* and the device to be used is thereby switched to the Wi-Fi device, the display in the setting display area 161 on the device setting screen 160 varies depending on the Wi-Fi setting table 12*d* or 12*e*.

The OS 12*a* has a setting as to whether to carry out NFC communication (this setting will be referred to below as the terminal's NFC setting). To carry out NFC printing, therefore, the terminal's NFC setting needs to be turned on. That is, even if the NFC device is set in the device control application 12*b*, when the terminal's NFC setting is turned off, NFC printing cannot be carried out. In the fifth embodiment, therefore, when the user unchecks the radio button

165*a* and checks the radio button 165*b* to set the NFC device, if the terminal's NFC setting is tuned off, an error display 180 appears. The error display 180 includes a message 181 asking whether the user will turn on the terminal's NFC setting, a Yes button 182, and a No button 183.

If the user taps the No button 183, the device setting screen 160 before the radio button 165*a* has been checked is displayed without the terminal's NFC setting being turned on. If the user taps the Yes button 182, the screen displayed on the LCD 16 is switched from the device setting screen 160 to a setting screen 130 displayed by the OS 12*a*. On the setting screen 130, the user can turn on the terminal's NFC setting.

When the user manipulates the Back button with the setting screen 130 displayed, if the terminal's NFC setting has been turned on, the screen displayed on the LCD 16 is switched to the device setting screen 160 with the radio button 165*b* checked. If the user manipulates the Back button without turning on the terminal's NFC setting, the device setting screen 160 with the error display 180 is displayed again instead of the setting screen 130. Therefore, the screen displayed after the Back button is manipulated varies depending on whether, on the setting screen 130, the terminal's NFC setting has been turned on, so the user can clearly determine whether the terminal's NFC setting has been turned on.

If the terminal's NFC setting has been turned on, when the NFC device is set with the device control application 12*b*, NFC printing can be carried out. When the user unchecks the radio button 165*a* and checks the radio button 165*b* on the device setting screen 160 with the terminal's NFC setting turned on and the device to be used is thereby switched to the NFC device, the display in the setting display area 161 on the device setting screen 160 varies depending on the NFC setting table 12*c*.

When the Wi-Fi device has been set, that is, Wi-Fi printing has been selected, NFC printing cannot be executed. In the fifth embodiment, therefore, when, with the preview screen 50*a* intended for Wi-Fi printing displayed, the user holds the terminal 10 over the MFP 100, which is a type of NFC device, that is, the user brings the antenna (not illustrated) of the near-field communication unit 22 to the antenna (not illustrated) of the near field communication unit 122, an error display 170 appears.

The error display 170 includes a message 171 asking whether the user will switch the device to be used from the Wi-Fi device to an NFC device, a Yes button 172, and a No button 173. When the user taps the No button 173, the error display 170 disappears without the device to be used being switched.

When the user taps the Yes button 172, the device to be used is switched from the Wi-Fi device to an NFC device. In this case, the screen displayed on the LCD 16 is switched to the device setting screen 160 with the radio button 165*b* checked. Therefore, even if the user attempts to carry out NFC printing in spite of a Wi-Fi device being set, the user can set an NFC device through the error display 170. This provides a user interface superior in maneuverability.

Figure 9A:
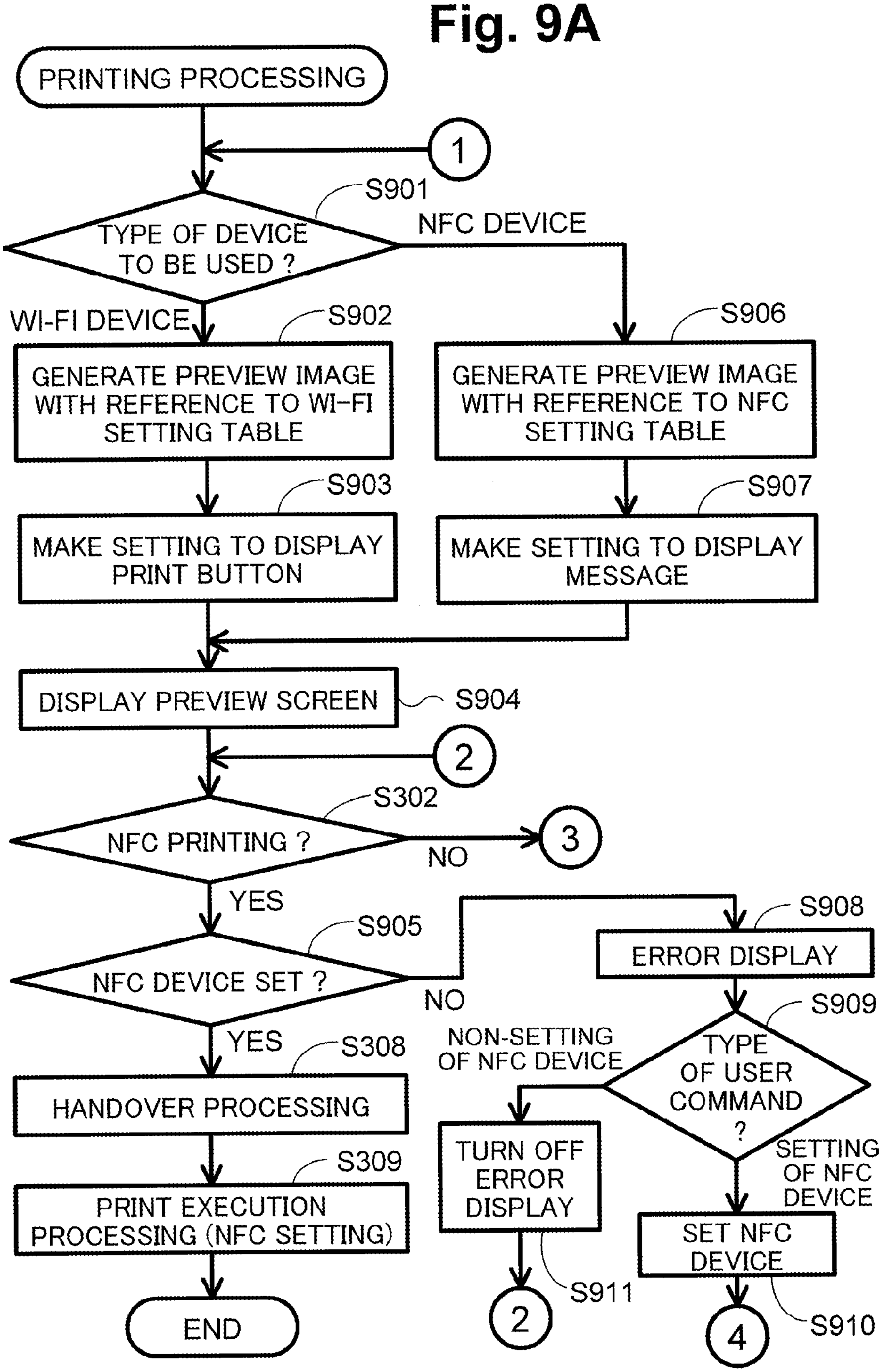
FIGS. 9A and 9B illustrate a flowchart of printing processing in the fifth embodiment.
Figure 9B:
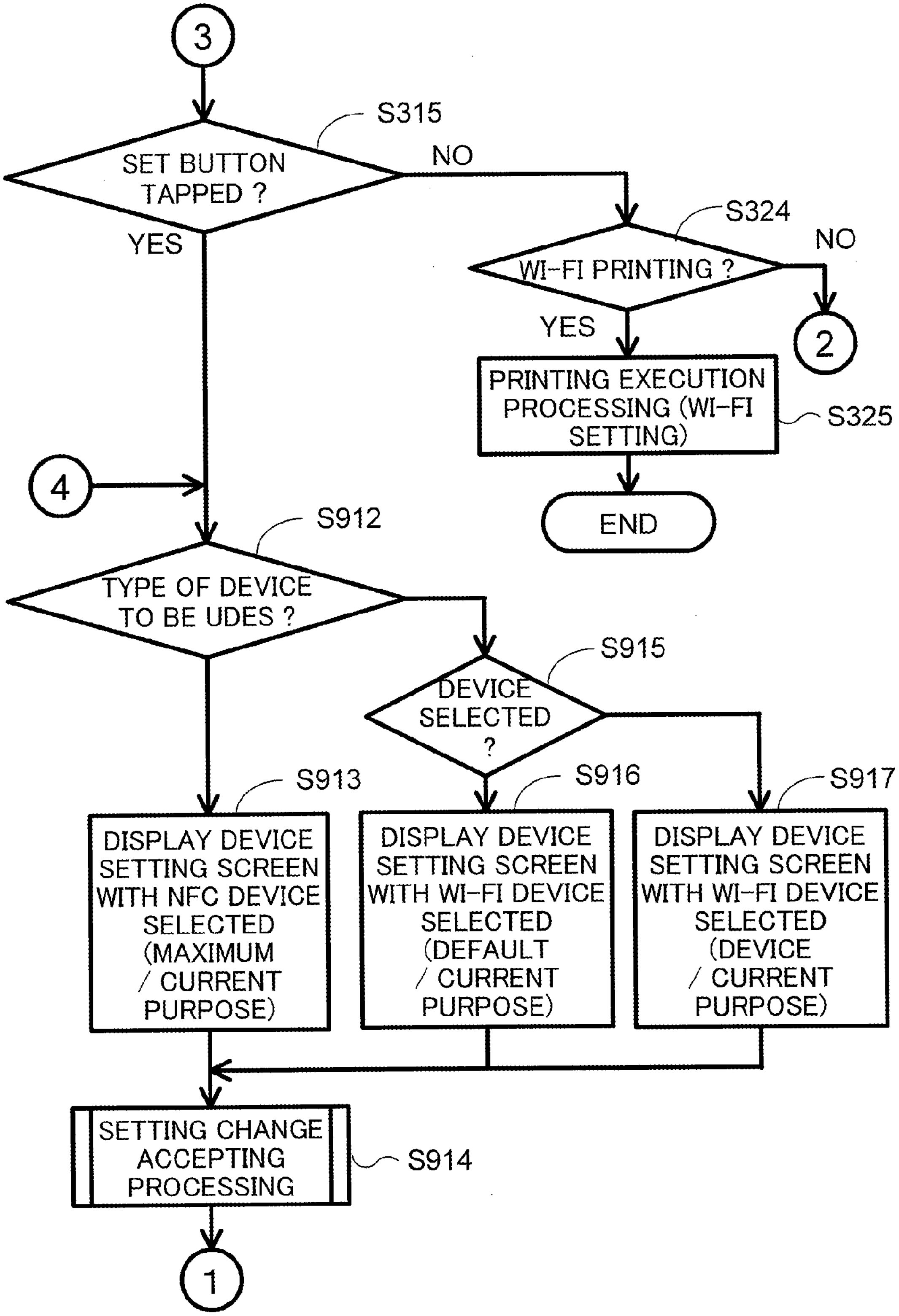

FIGS. 9A and 9B illustrate a flowchart of printing processing in the fifth embodiment. Processing in each step in the flowchart in FIGS. 9A and 9B is executed by the CPU 11 under control by the device control application 12*b* in the fifth embodiment. The printing processing in the fifth embodiment is started when a purpose of printing is selected on a menu screen (not illustrated) and print target data is then selected on a target selection screen (not illustrated), as in the first embodiment described above. The CPU 11 determines whether the setting of the type of the device to be used is a Wi-Fi device or an NFC device (S901).

If the CPU 11 determines that the device to be used is a Wi-Fi device (the result in S707 is "Wi-Fi device"), the CPU 11 creates an image 51 as a preview image with reference to the Wi-Fi setting table 12*d* or 12*e* as in S708 described above (S902). The CPU 11 then makes a setting so that the Print button 52 is displayed (S903) and switches the screen on the LCD 16 from the target selection screen to the preview screen 50, specifically, the preview screen 50*a* (S904).

If the CPU 11 determines that the device to be used is an NFC device (the result in S901 is "NFC device"), the CPU 11 creates an image 51 as a preview image with reference to the NFC setting table 12*c* as in S715 described above (S906). The CPU 11 then makes a setting so that the message 55 is displayed (S907) and switches the screen on the LCD 16 from the target selection screen to the preview screen 50, specifically, the preview screen 50*b* (S904).

Upon completion of the processing in S904, the CPU 11 places the processing on standby (the result in S302 is No, the result in S315 is No, and the result in S324 is No). If NFC printing is started with the preview screen 50 displayed (the result in S302 is Yes) and if an NFC device has been set as the device to be used (the result in S905 is Yes), the CPU 11 executes handover processing (S308) and executes printing execution processing (S309), terminating the printing processing in the fifth embodiment.

If an NFC device has not been set as the device to be used, that is, a Wi-Fi device has been set (the result in S905 is No), the CPU 11 displays the error display 170 (S908). If the CPU 11 recognizes that that the touch panel 17 has detected a tap of the No button 173 in the error display 170 (the result in S909 is "non-setting of NFC device"), the CPU 11 turns off the error display 170 (S911) and causes the processing to return to S302.

If the CPU 11 recognizes that that the touch panel 17 has detected a tap of the Yes button 172 in the error display 170 (the result in S909 is "setting of NFC device"), the CPU 11 sets an NFC device as the device to be used (S910) and causes the processing to proceed to S912.

If the CPU 11 recognizes that that the touch panel 17 has detected a tap of the set button 53 on the preview screen 50 (the result in S302 is No and the result in S315 is Yes) and if an NFC device has been set as the device to be used (the result in S912 is "NFC device"), the CPU 11 switches the screen on the LCD 16 from the preview screen 50 to the device setting screen 160 with the radio button 165*b* checked (S913). Items 41 for the selected purpose and their current settings 42 in the NFC setting table 12*c* are displayed in the setting display area 161 on the device setting screen 160 displayed in S913. A range settable for the setting 42 of each item 41 is the default setting range in the NFC setting table 12*c* and a range determined according to the current purpose as in S319 described above.

If a Wi-Fi device has been set as the device to be used (the result in S912 is "Wi-Fi device") and if the type (in the fifth embodiment, the model name) of the MFP 100, which is the Wi-Fi device on the distant site, has been selected (the result in S915 is Yes), the CPU 11 switches the screen on the LCD 16 from the preview screen 50 to the device setting screen 160 with the radio button 165*a* checked (S917). Current settings 42 for the current purpose in the device-specific Wi-Fi setting table 12*e* corresponding to the selected type are displayed in the setting display area 161 on the device setting screen 160 displayed in S917.

If a Wi-Fi device has been set as the device to be used but the type of the Wi-Fi device on the distant site (in the fifth embodiment, the MFP 100), has not been selected (the result in S915 is No), the CPU 11 switches the screen on the LCD 16 from the preview screen 50 to the device setting screen 160 with the radio button 165*a* checked (S916). Current settings 42 for the current purpose in the default Wi-Fi setting table 12*d* are displayed in the setting display area 161 on the device setting screen 160 displayed in S916.

Upon completion of the processing in S913, S916, or S917, the CPU 11 executes setting change accepting processing, in which new setting values set by the user on the device setting screen 160 are accepted, (S914) and causes the processing to return to S901. Setting change accepting processing in S914 will be described later in detail with reference to FIGS. 10A to 10C. If Wi-Fi printing is started with the preview screen 50 displayed (the result in S315 is No and the result in S324 is Yes), the CPU 11 executes printing execution processing (S325), terminating the printing processing in the fifth embodiment.

Figure 10A:
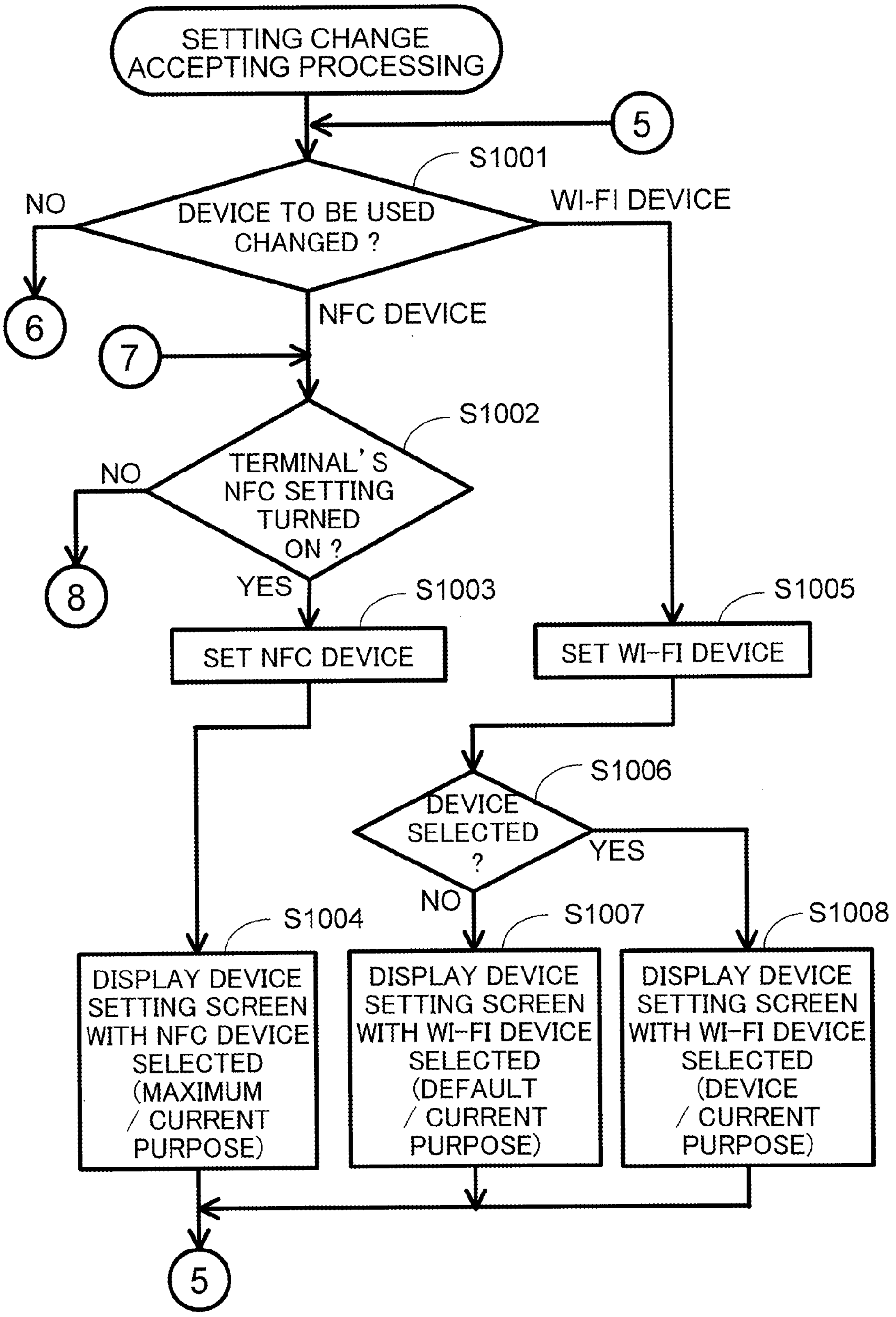
FIGS. 10A to 10C illustrate a flowchart of setting change accepting processing in the fifth embodiment.
Figure 10B:
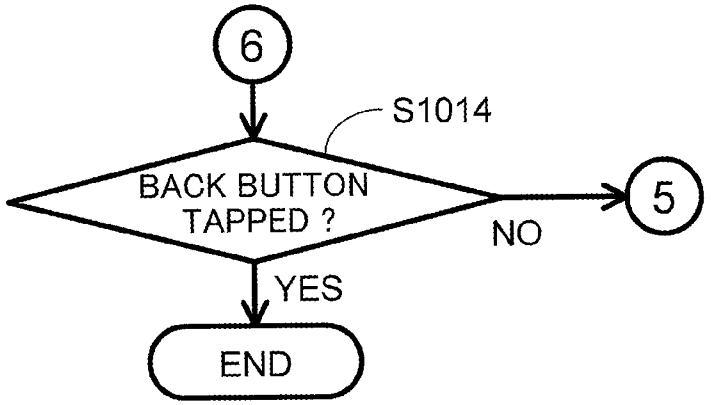
Figure 10C:
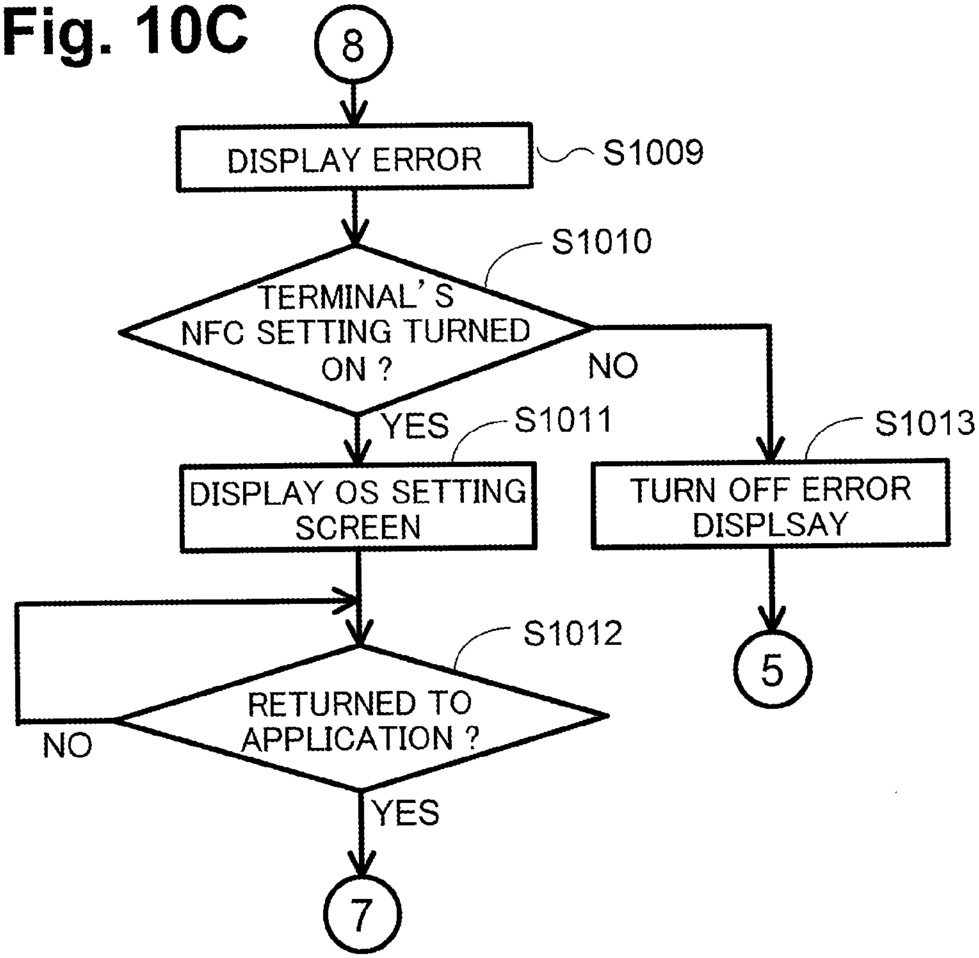

FIGS. 10A to 10C illustrate a flowchart of the above-mentioned setting change accepting processing in S914. The CPU 11 waits until the user changes the device to be used or manipulates the Back button (the result in S1001 is No and the result in S1014 is No). If the CPU 11 recognizes that the device to be used has been changed from an NFC device to a Wi-Fi device, that is, the radio button 165*b* has been unchecked and the radio button 165*a* has been checked (the result in S1001 is "Wi-Fi device"), the CPU 11 sets a Wi-Fi device as the device to be used (S1005).

If the type of the Wi-Fi device on the distant site has been selected (the result in S1006 is Yes), the CPU 11 displays the device setting screen 160 on the LCD 16 as in S918 (S1008). If the type of the Wi-Fi device on the distant site has not been selected (the result in S1006 is No), the CPU 11 displays the device setting screen 160 on the LCD 16 as in S917 (S1007). Upon completion of the processing in S1007 or S1008, the CPU 11 causes the processing to return to S1001.

If the CPU 11 recognizes that the device to be used has been changed from a Wi-Fi device to an NFC device, that is, the radio button 165*a* has been unchecked and the radio button 165*b* has been checked (the result in S1001 is "NFC device") and if the terminal's NFC setting has been turned on (the result in S1002 is Yes), the CPU 11 sets an NFC device as the device to be used (S1003). The CPU 11 then displays the device setting screen 160 on the LCD 16 as in S913 (S1004) and causes the processing to return to S1001.

If the terminal's NFC setting has not been turned on (the result in S1002 is No), the CPU 11 displays the error display 180 (S1009). If the CPU 11 recognizes that the touch panel 17 has detected a tap of the No button 183 in the error display 180 (the result in S1010 is No), the CPU 11 turns off the error display 180 (S1013) and causes the processing to return to S1001.

If the CPU 11 recognizes that the touch panel 17 has detected a tap of the Yes button 182 in the error display 180 (the result in S1010 is Yes), the CPU 11 causes the OS 12*a* to display the menu screen 130 on the LCD 16 (S1011). When the user taps the Yes button 182, therefore, the user can make the terminal's NFC setting on the menu screen 130.

If the user manipulates the Back button while the menu screen 130 is being displayed by the OS 12*a*, the OS 12*a* turns off the menu screen 130, after which processing executed by the CPU 11 is returned to processing executed under control by the device control application 12*b*. Upon completion of the processing in S1011, the CPU 11 waits until processing executed by the CPU 11 is returned to processing executed under control by the device control application 12*b* (the result in S1012 is No). If processing executed by the CPU 11 is returned to processing executed under control by the device control application 12*b* (the result in S1012 is Yes), the CPU 11 causes the processing to return to S1002 under control by the device control application 12*b*.

If the user turns on the terminal's NFC setting on the menu screen 130, when the user manipulates the Back button, the CPU 11 executes the processing in S1004. In this case, the device setting screen 160 on which an NFC device has been selected as the device to be used is displayed on the LCD 16. If the user manipulates the Back button without turning on the terminal's NFC setting, the error display 180 is displayed again.

In the fifth embodiment described above, if the terminal's NFC setting has not been turned on at the switchover of the device to be used from a Wi-Fi device to an NFC device, the menu screen 130 can be displayed by the OS 12*a* through the error display 180. This enables the user to turn on the terminal's NFC setting on the menu screen 130. The terminal's NFC setting can be changed on the menu screen 130 displayed by the OS 12*a* as a basic manipulation on the terminal 10 in which the OS 12*a* is installed. Therefore, the user can change the terminal's NFC setting on the most easy-to-comprehend screen, improving user's convenience.

Although the user has set a Wi-Fi device as the device to be used on the device setting screen 160, the user may bring the terminal 10 close to the an NFC device (in the fifth embodiment, the MFP 100) as if the user were attempting to carry out NFC printing, instead of tapping the Print button 52. In this case, the error display 170 is displayed. If the user desires NFC printing, therefore, the user can switch the device to be used to an NFC device in the error display 170. This is convenient when Wi-Fi printing and NFC printing are selectively carried out.

In the first to fifth embodiments, the device control application 12*b* is an example of a communication program, the terminal 10 is an example of a communication apparatus, the MFP 100 is an example of an external device, the near-field communication unit 22 is an example of a first communication unit, the wireless communication unit 23 is an example of a second communication unit, the flash memory 12 is an example of a storage, the CPU 11 is an example of a controller or a portion of a controller, the touch panel 17 is an example of a manipulation unit, the LCD 16 is an example of a display, the NFC setting table 12*c* is an example of a first setting table, the Wi-Fi setting tables 12*d* and 12*e* are each an example of a second setting table, the print function is an example of a function, the printing of a photo, the printing of a document, and the printing of a Web page are each an example of a purpose, NFC communication is an example of a near-field wireless communication method, Wi-Fi communication is an example of a wireless communication method different from the near-field wireless communication methods, the sheet size is an example of a specific item, the model name is an example of the type of an external device, the specification information is an example of capacity information, the inkjet method is an example of a first printing method, the laser method is an example of a second printing method, the setting for a device for which the inkjet method is set as the printing method in the NFC setting table 12*c* is an example of a first printing setting, the setting for a device for which the laser method is set as the printing method in the NFC setting table 12*c* is an example of a second printing setting, and the engine type is an example of second information.

The CPU 11 that executes the processing in S309 is an example of a first data transmission processing. The CPU 11 that executes the processing in S325 is an example of a second data transmission processing. The CPU 11 that executes the processing in S302 and S324 is an example of a first determining processing. The CPU 11 that executes the processing in S307 is an example of a second determining processing. The CPU 11 that executes the processing in S306 is an example of a capacity obtaining processing. The CPU 11 that executes the processing in S303 is an example of a first information obtaining processing. The CPU 11 that executes the processing in S305 is an example of a third determining processing. The CPU 11 that executes the processing in S304 is an example of a fourth determining processing. The CPU 11 that executes the processing in S313 is an example of a setting changing processing, a first display control processing, and a sixth display control processing. The CPU 11 that executes the processing in S301 and S710 is an example of a second display control processing and a fifth display control processing. The CPU 11 that executes the processing in S317 and S323 is an example of a third display control processing. The CPU 11 that executes the processing in S319 is an example of a fourth display control processing. The CPU 11 that executes the processing in S330 is an example of a first setting reflecting processing. The CPU 11 that executes the processing in S329 is an example of a fifth determining processing. The CPU 11 that executes the processing in S403 is an example of a second setting reflecting processing. The CPU 11 that executes the processing in S501 is an example of a second information obtaining processing. The CPU 11 that executes the processing in S502 is an example of a sixth determining processing. The CPU 11 that executes the processing in S914 is an example of a setting processing. The CPU 11 that executes the processing in S913 is an example of a seventh display control processing.

The processing in S309 is an example of first data transmission processing. The processing in S325 is an example of second data transmission processing. The processing in S302 and S324 is an example of first determining processing. The processing in S307 is an example of second determining processing. The processing in S306 is an example of capacity obtaining processing. The processing in S303 is an example of first information obtaining processing. The processing in S305 is an example of third determining processing. The processing in S304 is an example of fourth determining processing. The processing in S313 is an example of setting changing processing, first display control processing, and sixth display control processing. The processing in S301 and S710 is an example of second display control processing and fifth display control processing. The processing in S317 and S323 is an example of third display control processing. The processing in S319 is an example fourth display control processing. The processing in S330 is an example first setting reflecting processing. The processing in S329 is an example of fifth determining processing. The processing in S403 is an example second setting reflecting processing. The processing in S501 is an example of second information obtaining processing. The processing in S502 is an example of sixth determining processing. The processing in S914 is an example of setting processing. The processing in S913 is an example of seventh display control processing.

The present invention have been described so far according to the embodiments, but the present invention is not limited to the above embodiments. It will be easily appreciated that various improvements and modifications are possible without departing from the intended scope of the present invention.

In each embodiment described so far, for example, the terminal 10 such as a smart phone has been exemplified as a communication apparatus in which the device control application 12*b* is installed, but various devices can be used as the communication apparatus if they can execute NFC communication and Wi-Fi communication. If a tablet terminal, a notebook personal computer, a mobile telephone, a digital camera, a music reproducing device, and other types of devices can carry out NFC communication and Wi-Fi communication, these devices can be used as a communication apparatus in which to install the device control application 12*b*. In each embodiment described so far, the OS 12*a* in the terminal 10 has been described as being an Android OS, but another OS may be used.

In each embodiment described so far, only the device control application 12*b* has been used to perform both NFC printing and Wi-Fi printing. However, even if an application to perform NFC printing and an application to perform Wi-Fi printing may be provided separately, the present invention is applicable.

In each embodiment described so far, the present invention has been applied to a case in which the terminal 10 uses the print function of the MFP 100. However, the present invention can also be applied to a case in which the terminal 10 uses, for example, the scan function of the MFP 100. For example, different specific scan settings may be provided depending on whether communication that works as a trigger to use the scan function of the MFP 100 is communication carried out by the near-field communication unit 22 or communication carried out by the wireless communication unit 23. A scan setting may be selectively e transmitted to the MFP 100 depending on whether communication that works as a trigger to use the scan function of the MFP 100 has been carried out by the near-field communication unit 22 or wireless communication unit 23.

In each embodiment described so far, the MFP 100 having a plurality of functions including the print function has been exemplified as an external device. A printer, a scanner, and other special devices having only a single function can also be used as an external device. In each embodiment described so far, Wi-Fi communication between the terminal 10 and the MFP 100 has been described as being carried out in the ad-hoc mode, but Wi-Fi communication may be carried out in the infrastructure mode through an access point (not illustrated). Print target data may be transmitted in NFC communication instead of Wi-Fi communication. Alternatively, print target data may be transmitted in various wireless communication methods such as a Bluetooth (registered trademark) communication method instead of Wi-Fi communication. In each embodiment described so far, NFC communication has been exemplified as a near field communication method, but another near field communication method complying with TransferJet (registered trademark) or another standard may be used.

In each embodiment described so far, through NFC communication, a model name has been obtained (S303), specification information has been obtained (S306), and an engine type has been obtained (S501). However, these information items may be obtained through Wi-Fi communication.

In the second embodiment, the new value of a setting 42 in the NFC setting table 12*c* has not been reflected as a setting in Wi-Fi printing if the type of the MFP 100 on the distant site has not been selected. Instead of this, if the type of the MFP 100 on the distant site has not been selected, the new value of the setting 42 in the NFC setting table 12*c* may be copied to the default Wi-Fi setting table 12*d*. In this case, a preferable condition to permit the copy is that the setting 42 of each specific item in the new NFC setting table 12*c* is within the setting range of the relevant item set in the default Wi-Fi setting table 12*d*, that is, within a range applicable to ordinary devices.

Alternatively, if the type of the MFP 100 on the distant site has not been selected, the model name of the MFP 100 on the distant site may be obtained through NFC communication. If the obtained model name has been stored in the device information 12*f*, the new value of the setting 42 in the NFC setting table 12*c* may be copied to the Wi-Fi setting table 12*e* corresponding to the model name. If the obtained model name has not been stored in the device information 12*f*, the new value of the setting 42 in the new NFC setting table 12*c* may be newly added as a setting in the Wi-Fi setting table 12*e* corresponding to the obtained model name.

In each embodiment described so far, handover processing has been executed in S308 when the model name of the MFP 100 on the distant site is received through NFC communication in S303 and the current NFC setting table 12*c* is determined to be available in S307. Instead of this, if NFC communication is established between the terminal 10 and the MFP 100, handover processing may be carried out and the model name of the MFP 100 on the distant site may be received through Wi-Fi communication.

In each embodiment described so far, the Wi-Fi setting table 12*d* or 12*e* or the NFC setting table 12*c* has been copied when the OK button 62 or OK button 72 is tapped. However, a copy button that commands the copying of settings may be provided. When the copy button is tapped, the relevant setting table may be copied regardless of whether the Wi-Fi setting table 12*d* or 12*e* or the NFC setting table 12*c* has been changed.

In each embodiment described so far, the background of an item 41 corresponding to a setting 42 unavailable to the MFP 100 on the distant site has been colored on the NFC setting screen 70*b* as an example of distinguishing the item 41 from other items 41. Instead of this, only the setting 42 unavailable to the MFP 100 on the distant site may be displayed. Alternatively, an item 41 corresponding to a setting 42 unavailable to the MFP 100 on the distant site may be displayed on the error screen 80.

In the fourth embodiment described above, the Print button 52 has been displayed or has not been displayed on the preview screen 50 depending on whether the preview screen 50 has been displayed due to the selection of a purpose in Wi-Fi printing or due to the selection of a purpose in NFC printing. In the fifth embodiment described above, displays on the preview screen 50*a* intended for Wi-Fi printing and the preview screen 50*b* intended for NFC printing have differed in that the message 55 is displayed on the preview screen 50*b* instead of the Print button 52, which is displayed on the preview screen 50*a*. The methods of distinguishing between the preview screen 50 (50*a*) intended for Wi-Fi printing and the preview screen 50 (50*b*) intended for NFC printing are not limited to the examples in the fourth and fifth embodiments described above. For example, these screens may be distinguished by different background colors or by displaying characters or symbols by which Wi-Fi printing and NFC printing can be distinguished.

In the fifth embodiment described above, the menu screen 130 has been displayed by the OS 12*a* through the error display 180 if the terminal's NFC setting has not been turned on at the switchover of the device to be used from a Wi-Fi device to an NFC device. Instead of this, if the terminal's NFC setting has not been turned on at the switchover of the device to be used from a Wi-Fi device to an NFC device, the device control application 12*b* may turn on the terminal's NFC setting without causing the OS 12*a* to display the menu screen 130. In this case, the terminal's NFC setting is automatically turned on without manipulation by the user himself, improving user's convenience. In this case as well, the error display 180 may be displayed to ask the user whether to turn on the terminal's NFC setting.

In the fifth embodiment described above, an NFC device has been automatically set as the device to be used when the processing in S910 is executed at the tap of the Yes button 172 in the error display 170. However, the processing in S910 may be omitted. In this case, the device setting screen 160 with the radio button 165*a* checked is displayed, so the user can set an NFC device as the device to be used by checking the radio button 165*b*. Upon completion of the processing in S910, the preview screen 50 may be displayed without the device setting screen 160 being displayed. In this case, the display on the preview screen 50 matches the selection of a purpose in NFC printing.

In each embodiments described so far, the CPU 11 has been described as executing the processing in FIGS. 3A to 5E, 7A and 7B, 9A and 9B, and 10A to 10C. However, a plurality of CPUs may execute the processing in these drawings in collaboration. Alternatively, a single integrated circuit (IC) such as an application-specific integrated circuit (ASIC) may execute the processing in these drawings or a plurality of such ICs may execute the processing in these drawings in collaboration. Alternatively, the CPU 11 and an IC such as an ASIC may execute the processing in these drawings in collaboration.

Features described in the above first to fifth embodiments may be appropriately combined. For example, if the result in S905 in FIG. 9A is Yes, the processing in S303 to S307 and S310 in FIG. 3A may be executed before the processing in S308 is executed.

While the disclosure has been described in detail with reference to the specific embodiments thereof, various changes, arrangements and modifications may be applied therein without departing from the spirit and scope of the disclosure.

What is claimed is:

1. A communication apparatus comprising:

a first communication unit communicable with an external device using a near-field wireless communication method;

a second communication unit communicable with an external device using a wireless communication method that differs from the near-field wireless communication method;

a storage storing:

a first setting table that includes a first setting used for a function to be started by the external device, the function including a print function, the function to be started in response to a first trigger comprising communication with the external device through the first communication unit using the near-field wireless communication method, and a second setting table that includes a second setting used for the function to be started by the external device, the function to be started in response to a second trigger comprising communication with the external device through the second communication unit using the wireless communication method; and a controller comprising at least one processor, the controller configured to:

store, in the storage, as the first setting table, a first printing setting used for the external device, the external device performing printing processing in a first printing method;

store a second printing setting used for the external device, the external device performing printing processing in a second printing method that differs from the first printing method; and if the first trigger comprising the communication with the external device through the first communication unit using the near-field wireless communication method is carried out:

obtain, through one of the first communication unit and the second communication unit, information identifying the second printing method, determine, based on the information identifying the second printing method, whether a printing method executed by the external device is the first printing method or the second printing method, if the printing method executed by the external device is the first printing method, transmit, as first execution data, a combination of data to be printed and at least one of the first setting table and data created based on the first setting table, to the external device through one of the first communication unit and the second communication unit, if the printing method executed by the external device is the second printing method, transmit, as second execution data, a combination of the data to be printed and at least one of the second setting table and data created based on the second setting table, to the external device through one of the first communication unit and the second communication unit, and if the second trigger comprising the communication with the external device through the second communication unit using the wireless communication method is carried out, transmit, as second execution data, the combination of the data to be printed and the at least one of the second setting table and the data created based on the second setting table, to the external device through the second communication unit.

2. The communication apparatus according to claim 1, wherein:

the first setting table includes a specific setting item and the controller is configured to set the specific setting item within a first predetermined range including a setting unavailable to some types of external devices; and the second setting table includes the specific setting item and the controller is configured to set the specific setting item within a settable range available to the external device, a type of which has been identified.

3. The communication apparatus according to claim 2, wherein, when a type of a second external device at a communication destination has not been identified, the controller is configured to set the specific setting item within a second predetermined range that is narrower than the first predetermined range.

4. The communication apparatus according to claim 1, wherein the controller is configured to:

store, in the first setting table and the second setting table, a purpose for which the function is carried out;

if the first trigger comprising the communication with the external device through the first communication unit using the near-field wireless communication method is carried out, transmit the first setting table comprising the purpose; and if the second trigger comprising the communication with the external device through the second communication unit using the wireless communication method is carried out, transmit the second setting table comprising the purpose.

5. The communication apparatus according to claim 1, wherein the controller is configured to, if the first trigger comprising the communication with the external device through the first communication unit using the near-field wireless communication method is carried out, execute first determining processing, in which the controller determines whether the external device is able to use the first setting table, the first determining processing comprising:

executing capacity-obtaining processing, in which the controller obtains capacity information, which indicates a capacity of the external device, from the external device through one of the first communication unit and the second communication unit;

determining whether the capacity of the external device is enough to use the first setting table, based on the capacity information obtained in the capacity-obtaining processing; and if the capacity of the external device is enough to use the first setting table, transmitting the first execution data to the external device.

6. The communication apparatus according to claim 5, wherein the controller is configured to:

if the first trigger comprising the communication with the external device through the first communication unit using the near-field wireless communication method is carried out, obtain, through one of the first communication unit and the second communication unit, information identifying a type of the external device;

execute second determining processing, in which the controller determines whether the type of the external device has been stored in the storage;

if it is determined in the second determining processing that the type of the external device has not been stored in the storage, obtain the capacity information, which indicates the capacity of the external device, from the external device; and if it is determined in the second determining processing that the type of the external device has been stored in the storage, determine, based on the capacity of the external device, the type of the external device.

7. The communication apparatus according to claim 5, wherein the controller is configured to:

if the first trigger comprising the communication with the external device through the first communication unit using the near-field wireless communication method is carried out, execute second determining processing, in which the controller determines whether the first setting table includes a setting unavailable to some types of external devices; and if it is determined in the second determining processing that the first setting table includes the setting unavailable to some types of external devices, and if it is determined in the first determining processing that the capacity of the external device is enough to use the first setting table, transmit the first execution data to the external device.

8. The communication apparatus according to claim 5, wherein the controller is configured to:

if it is determined in the first determining processing that the capacity of the external device is not enough to use the first setting table, execute setting-changing processing, in which the controller changes the first setting table based on the capacity of the external device.

9. The communication apparatus according to claim 8, comprising:

a manipulation unit; and a display, wherein the controller is configured to:

accept a first manipulation via the manipulation unit, and if it is determined in the first determining processing that the capacity of the external device is not enough to use the first setting table, then responsive to the first manipulation, cause display, on the display, of a first setting screen on which a new value of the first setting in the first setting table is to be accepted, the new value of the first setting being based on input received via the manipulation unit.

10. The communication apparatus according to claim 9, wherein the controller is configured to:

if the controller accepts a second manipulation via the manipulation unit, with a function-execution screen displayed on the display, the function-execution screen being configured to cause the external device to execute the function, execute second display-control processing, in which the controller causes display, on the display, of a second setting screen instead of the function-execution screen, the second setting screen being configured to receive a new value of the second setting in the second setting table, the new value of the second setting being based on second input received via the manipulation unit;

if the controller accepts a third manipulation on the manipulation unit, with the second setting screen displayed on the display during the second display-control processing, execute third display-control processing, in which the controller causes display of the first setting screen on the display instead of the second setting screen;

if the controller accepts a fourth manipulation on the manipulation unit, with the first setting screen displayed on the display during the third display-control processing, execute fourth display-control processing, in which the controller causes display of the second screen on the display instead of the first setting screen; and if the controller accepts the fourth manipulation on the manipulation unit, with the first setting screen displayed on the display during the first display-control processing, execute fifth display-control processing, in which the controller causes display of the function-execution screen on the display instead of the first setting screen.

11. The communication apparatus according to claim 9, wherein the controller is configured to:

determine a combination of values displayable on the first setting screen as choices of settings, the combination of values varying depending on a selectable purpose for executing the function, the first setting table comprising the combination of values.

12. The communication apparatus according to claim 9, wherein the controller is configured to:

if it is determined in the first determining processing that the capacity of the external device is not enough to use the first setting table, execute second display-control processing, in which an item included in the first setting table, the item having an unavailable setting, is displayed on the display.

13. The communication apparatus according to claim 1, comprising a manipulation unit, wherein the controller is configured to:

if the controller accepts a prescribed manipulation via the manipulation unit, execute setting-reflecting processing, in which the controller adds at least some settings included in the second setting table to the first setting table.

14. The communication apparatus according to claim 13, wherein:

the prescribed manipulation is to confirm a new value of the second setting in the second setting table; and in the setting-reflecting processing, the controller adds the new value of the second setting in the second setting table to the first setting table.

15. The communication apparatus according to claim 13, wherein the controller is configured to:

execute determining processing, in which the controller determines whether the first setting table has been changed according to a manipulation on the manipulation unit different from the prescribed manipulation; and if it is determined in the determining processing that the first setting table has not been changed, add a new value of the second setting to the first setting table in the setting-reflecting processing.

16. The communication apparatus according to claim 1, comprising a manipulation unit, wherein the controller is configured to:

when the controller accepts a manipulation via the manipulation unit, confirm a new value of the first setting in the first setting table; and if the new value of the first setting in the first setting table is available as a different setting in the second setting table, execute reflecting processing, in which the controller adds the new value of the first setting in the first setting table to the second setting table.

17. A communication apparatus comprising:

a manipulation unit;

a display;

a first communication unit communicable with an external device using a near-field wireless communication method;

a second communication unit communicable with an external device using a wireless communication method that differs from the near-field wireless communication method;

a storage storing:

a first setting table that includes a first setting used for a function to be started by the external device, the function to be started in response to a first trigger comprising communication with the external device through the first communication unit using the near-field wireless communication method, and a second setting table that includes a second setting used for the function to be started by the external device, the function to be started in response to a second trigger comprising communication with the external device through the second communication unit using the wireless communication method; and a controller comprising at least one processor, the controller configured to:

if the controller accepts a manipulation via the manipulation unit to select one of the first setting table and the second setting table via a selection screen displayed on the display, the selection screen being configured to receive a selection of one of the first setting table and the second setting table according to the manipulation, execute setting processing, in which the controller sets the one of the first setting table and the second setting table selected by the manipulation, if the first trigger comprising the communication with the external device through the first communication unit using the near-field wireless communication method is carried out:

execute data transmission processing, in which the controller transmits, as first execution data, at least one of the first setting table and data created based on the first setting table, to the external device through one of the first communication unit and the second communication unit, wherein when the controller sets the first setting table in the setting processing, the first execution data is transmitted to the external device without the selection screen being displayed on the display, and when the controller sets the second setting table in the setting processing, execute display-control processing, in which the controller causes display of the selection screen on the display, and if the second trigger comprising the communication with the external device through the second communication unit using the wireless communication method is carried out, transmit, as second execution data, at least one of the second setting table and data created based on the second setting table, to the external device through the second communication unit.

* * * * *